United States Patent [19]
Firth et al.

[11] Patent Number: 5,987,517
[45] Date of Patent: Nov. 16, 1999

[54] SYSTEM HAVING A LIBRARY OF PROTOCOL INDEPENDENT REENTRANT NETWORK INTERFACE FUNCTIONS FOR PROVIDING COMMON CALLING INTERFACE FOR COMMUNICATION AND APPLICATION PROTOCOLS

[75] Inventors: Richard Louis Firth, Redmond; David Treadwell, Woodinville, both of Wash.

[73] Assignee: Microsoft Corporation, Redmond, Wash.

[21] Appl. No.: 08/622,830

[22] Filed: Mar. 27, 1996

[51] Int. Cl.6 ...................................................... G06F 13/00
[52] U.S. Cl. ............................................................... 709/230
[58] Field of Search ........................ 395/200.57, 200.58, 395/200.59, 200.47, 200.48, 200.49; 709/200, 203, 217, 218, 219, 220, 221, 228, 230, 231, 232

[56] References Cited

U.S. PATENT DOCUMENTS

| | | | |
|---|---|---|---|
| 5,425,028 | 6/1995 | Britton et al. | 395/800 |
| 5,535,338 | 7/1996 | Krause et al. | 395/800 |
| 5,537,417 | 7/1996 | Sharma et al. | 709/228 |
| 5,572,724 | 11/1996 | Watanabe et al. | 707/200 |
| 5,706,434 | 1/1998 | Kremen et al. | 709/218 |
| 5,706,437 | 1/1998 | Kirchner et al. | |
| 5,710,908 | 1/1998 | Man . | |

OTHER PUBLICATIONS

"Netscape Navigator", by Metz, Cade, PC Magazine, V14, N17, p. 188(1), Oct. 10, 1995.
"Internet and on–Line", by Metz, Cade, PC Magazine, V15, N1, p. 114(2), Jan. 9, 1996.
"A Look at Progress", by Roti, Steve, DBMS, V6, N6, p. 85 (2), Jun. 1993.
"Take a Walk on the Web Site", by Adam Gaffin, Network World, p. 57, May 8, 1995.
Developing Transport–Independent Applications Using the Windows Sockets Interface, David Treadwell, Microsoft Corporation, Mar. 1, 1995.
Leach and Baron, "VB leads Microsoft rush to Net," *PC Week*, p. 8 (Dec. 18, 1995).
Baron, "New tools target intranets," *PC Week*, p. 51 (Jan. 8, 1996).
Nadile and Pickering, "MS Office plan: All net, all the time," *PC Week*, pp. 31, 34 (Dec. 18, 1995).
Nadile, "Microsoft expanding OCX," *PC Week*, p. 6 (Feb. 26, 1996).
Moeller, "Microsoft draws a line in the Internet sand; Strategy's sound, but can it deliver the goods?", *PC Week*, pp. 19, 126 (Dec. 11, 1995).
Nadile, "Microsoft Expanding OCX", *PC Week*, (Feb. 1996).
Foley, "Microsoft Draws a Line in the Internet Sand", *PC Week*, pp. 19–20 (Dec. 1995).

(List continued on next page.)

*Primary Examiner*—Moustafa M. Meky
*Attorney, Agent, or Firm*—Klarquist Sparkman Campbell Leigh & Whinston, LLP

[57] ABSTRACT

A library of reentrant networking functions organized with file system semantics is provided to allow a client application on a client computer connected to a computer network to establish communications with and exchange information with a server application on a server network computer. The library of reentrant networking functions are organized with file system semantics and parallel the function, structure and organization of a file system. Individual reentrant networking functions provide multiple networking features. The reentrant networking functions also provide asynchronous operations and security features. The library of reentrant networking functions can be included in, and called from multiple client applications. This library of reentrant networking function simplifies the creation of client applications such as network browsers that communicate with the Internet or an intranet computer network.

32 Claims, 8 Drawing Sheets

OTHER PUBLICATIONS

Powell et al., "WinInet", *Microsoft Interactive Developer,* 1:89–98 (Spring 1996).

Richter, "Microsoft's Internet Extensions for WIN32", *Microsoft Interactive Developer,* pp. 100–104 (Spring 1996).

Hightower, "HTML Conversion and FTP Automation", *Dr. Dobb's Journal,* pp. 82–86 (Apr. 1996).

Doyle, et al., "Proposing a Standard Web API", *Dr. Dobb's Journal,* pp. 18–26 (Feb. 1996).

Calcote, "Writing a Portable Transport–Independent Web Server", *Dr. Dobb's Journal,* pp. 60–65 (May 1996).

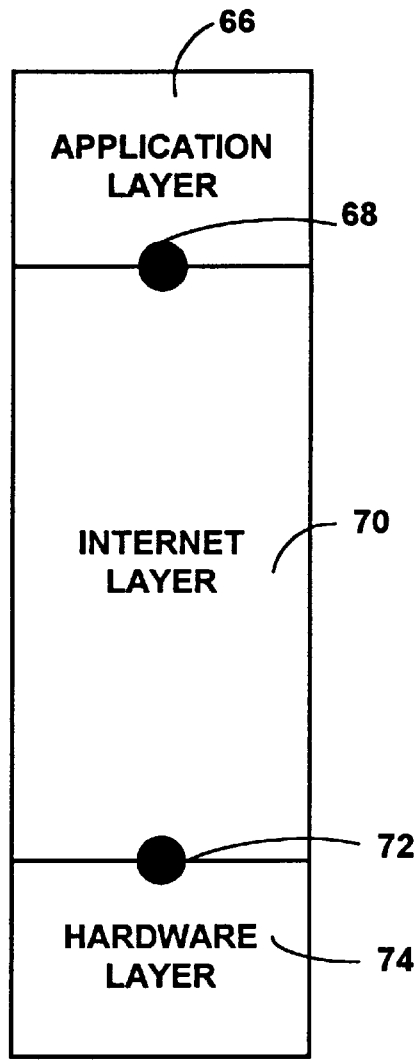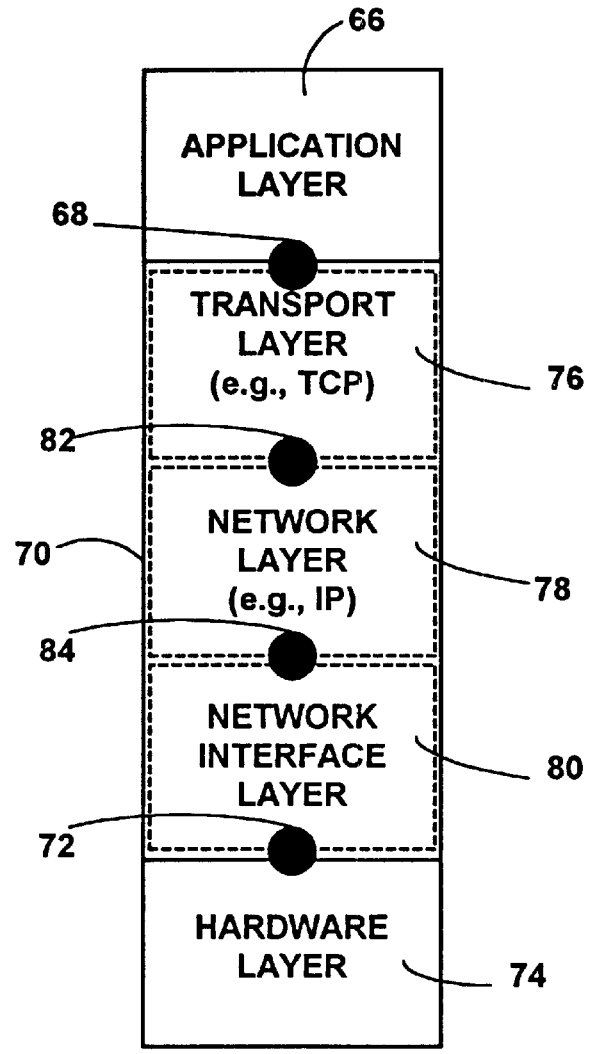
FIG. 4A
FIG. 4B 5,987,517

SYSTEM HAVING A LIBRARY OF PROTOCOL INDEPENDENT REENTRANT NETWORK INTERFACE FUNCTIONS FOR PROVIDING COMMON CALLING INTERFACE FOR COMMUNICATION AND APPLICATION PROTOCOLS

FIELD OF INVENTION

The present invention relates to creating computer network applications. More specifically, it relates to creating simplified computer network applications by using a library of reentrant network functions which allow an application to reduce the source code required to interact with a computer network such as the Internet.

BACKGROUND AND SUMMARY OF THE INVENTION

The Internet is a world-wide network of cooperating computer networks. Connected to the cooperating network of computer networks which make up the Internet are thousands of individual computers. The individual computers use network protocols to communicate with other computers connected to the Internet. A network protocol is a set of rules defining how a computer can "talk" to another computer. Computers connected to the Internet typically use the Transmission Control Protocol (TCP) and the Internet Protocol (IP) protocol suite to communicate.

TCP/IP is a layered set of protocols which is conceptualized as being stacked vertically into layers. TCP is a transport layer that defines data flow, acknowledges data, and retransmits lost or damaged data. However, the User Datagram Protocol (UDP) is also commonly used as a transport layer in place of TCP. IP is a network layer that defines the format of data and the basic unit of data transfer. TCP/IP provides a reliable, byte-stream-oriented virtual circuit for data transfer and is known in the art. There are also higher level application protocols in the Internet protocol suite including File Transfer Protocol (FTP), Simple Mail Transfer Protocol (SMTP), Hyper Text Transfer Protocol (HTTP), Gopher, etc. which use TCP/IP to pass data across the Internet.

From a user's point of view, access to the Internet and its services typically are accomplished by invoking application programs (e.g., Internet browsers, e-mail, etc.). The application programs act as an interface between a user and the Internet. The application programs are "client" programs that accept commands from the user and obtain Internet information and services by sending requests to "server" programs on another computer at some other location on the Internet. With the increasing popularity and accessibility of the Internet, a wide variety of application programs such as word processors, personal finance managers, and spreadsheets, etc., are emerging with embedded Internet access software or functionality.

Creating application programs which act as an interface between a user and the Internet is not a trivial task and presents a number of difficult problems. An Internet application program must recognize, understand, and properly handle all of the details of multiple application protocols in the Internet protocol suite (e.g., HTTP, FTP, Gopher, etc.). Internet application protocols typically communicate with the underlying protocols (e.g., TCP/IP) through software communication facilities (e.g., sockets). These communication facilities as well as the underlying protocols must also be managed by an application.

To provide the necessary functionality for a user, the application program must a manage a large number of details for the Internet application protocols, communication facilities, and underlying protocols, including establishing/terminating connections, filing data structures, setting flags, setting timers, creating data packets, sequencing data, sending/receving data, error handling for bad or incomplete data, etc.

If multiple simultaneous Internet application protocol connections are desired (e.g., HTTP and an FTP connection), then the application program must manage the large number of details for each of the multiple connections. If security features are desired (e.g., encryption, secure sockets layer (SSL), etc.) then the application program must also handle the security details.

If a new Internet protocol or communication facility is desired, new source code must be added to the application program. If an existing Internet protocol or communication facility is changed to comply with an evolving standard or the addition of an advanced feature (as is common in the rapidly changing Internet environment), the source code for the application program must be modified at a number of different levels to comply with the desired changes.

As is known in the art, networking function can be created and stored in standard function libraries, such as the "libwww.ext" (e.g., "libwww.lib" for the Windows operating system, "libwww.a" for the UNIX® operating system, etc.) by the Worldwide Web (W3) Consortium at the Massachusetts Institute of Technology, in Cambridge, Mass.

Such standard networking libraries are linked to an application program to provide networking functionality. However, standard function libraries known in the art are typically not reentrant. Reentrant functions are functions that can be repeatedly called from one or more application program without interference.

Every application program which desires to use the standard function library links in its own copy of the function library. This significantly increases the overall size of the application program, and may result in multiple copies of the same function library linked to a number of different application programs which wastes a significant amount of computer resources (e.g., memory, secondary storage, etc.).

As a result, the application programs are very complex and very costly to develop. In addition, this complex application program code is often hard to modify without introducing new or additional software defects, and is very difficult to debug after modifications are made.

In accordance with a preferred embodiment of the present invention, problems associated with creating application programs which access the Internet and other computer networks are overcome. An Internet application program interface (API) (which will be explained in detail below) including a set of reentrant Internet-specific functions is used. The reentrant functions in the Internet API reside in a dynamic link library (DLL) which is used by multiple application programs. There is typically only one copy of the Internet API DLL on any computer, and all application programs which need to contact a computer network like the Internet use the same reentrant function calls stored in the DLL. In contrast, a copy of a non-reentrant networking function would reside in every application program that needed it, and the non-reentrant function in a given application program could not be called by any other application program.

The reentrant Internet API functions also eliminate the need to embed source code directly in an application program to manage Internet application protocols (e.g., HTTP, FTP, Gopher, etc), communication facilities (e.g., sockets) or the underlying protocols (e.g., TCP/IP).

The reentrant Internet functions provided by the Internet API of the present invention manage connection to and communication with the Internet for the application program. The reentrant Internet functions comply with standard API programming standards and treat arguments and errors in a consistent manner. The reentrant functions provide a clean and concise interface to the Internet or other computer networks (e.g., a Local Area Network or intranet) for an application program. The reentrant functions use file system semantics (e.g., InternetOpenUrl( )≈OpenFile( ), InternetReadFile( )≈ReadFile( ), etc.) and have a logical syntax, functionality, structure and organization that parallels file system operations that are well known in the art. The file system semantics used by the Internet API abstract a large number of network connection details to a level of file system commands. This is not the case for other libraries of networking functions such as the "libwww.ext" described above. The other libraries require a developer to become familiar with a large number of unique function call names to use the networking functions.

The Internet API functions are also provide a hierarchical relationship between the functions. The function hierarchy is the result defining a number of independent and dependent function levels, where the functions at each level return Internet handles. A Internet handle is an index into an application specific object table. The Internet handles returned at level-N are used to call the Internet API functions on level-N−1. The function hierarchy provides a concise way to manage a large number of networking details by propagating access to networking data to the next lower function level through the Internet handle, thereby eliminating a significant amount of data management overhead. The function hierarchy and Internet handles will be explained in detail below.

As an example, suppose an Internet application program is to open an FTP session with a remote server application at a desired location on the Internet. In the preferred embodiment of the present invention, calls to two of the reentrant Internet API functions (e.g., InternetOpen( . . . ), InternetConnect( . . . ,FTP, . . . ), which will be explained in detail below) will initialized an Internet session, establish a connection, and manage all the underlying details including the FTP protocol, the communication facilities required (e.g., a socket connection), and the underlying protocols (e.g., TCP/IP) to establish communications with a remote server application on a remote computer connected to the Internet. The Internet application program does not have to include source code to establish an Internet connection, handle the FTP protocol, the communications facilities, or the underlying protocols. All of these details are abstracted in the Internet API and are hidden from or transparent to the application program.

The reentrant Internet API functions also provide built-in security features and asynchronous operations. An Internet application program can use the security features (e.g., encrypt data, use a proxy application as a "firewall, etc.) by setting parameters and calling selected Internet API functions. Many of the reentrant. Internet API functions can be used in an asynchronous mode of operation. In a synchronous mode of operation, an application program makes a function call, and then waits for the completion of the function call before it can continue executing. In an asynchronous mode of operation, an application program makes a function call and immediately continues executing other program operations. When the asynchronous function call operations are complete, the application program is contacted and can then process any data returned from the asynchronous function call. The use of asynchronous operations dramatically improves the operation of application programs which provide user interfaces (e.g., an Internet browser). Since the application program is not blocked while waiting for an asynchronous function call to complete, it can continue to interact with a user.

If an existing Internet protocol or communication facility is modified or evolved, an application program which uses the Internet API will require minimal or possibly no modifications. The reentrant Internet API functions would instead be modified, and the details of the changes would not be visible to, and need not be incorporated in, the application program. If a new Internet protocol, communication facility, etc. is added, the application would require minimal modification (e.g., adding a new argument to an existing re-entrant Internet API function call or calling a new Internet API function).

The reentrant functions in the Internet API allow application programs to be written for the Internet without large amounts of source code to manage the details of Internet application protocols, communications facilities and underlying protocols. The Internet API functions allow a developer to focus on the development of a specific application program, instead of spending a large amount of time handling Internet connection details. As a result, Internet application programs are less complex, less costly to develop, smaller in size, and easier to modify if new functionality is desired since most of the Internet details an application program typically needs to manage are handled by the Internet API functions. In addition the Internet API functions can also be used for intranet applications for establishing communications with a variety of computer networks.

The foregoing and other features and advantages of the preferred embodiment of the present invention will be more readily apparent from the following detailed description, which proceeds with reference to the accompanying drawings.

BRIEF DESCRIPTION OF THE DRAWINGS

FIG. 4A is a block diagram illustrating the conceptual layout of software for the preferred embodiment of the present invention.

FIG. 4B is a block diagram showing an expanded view of FIG. 4A.

DETAILED DESCRIPTION OF A PREFERRED EMBODIMENT

Figure 1:
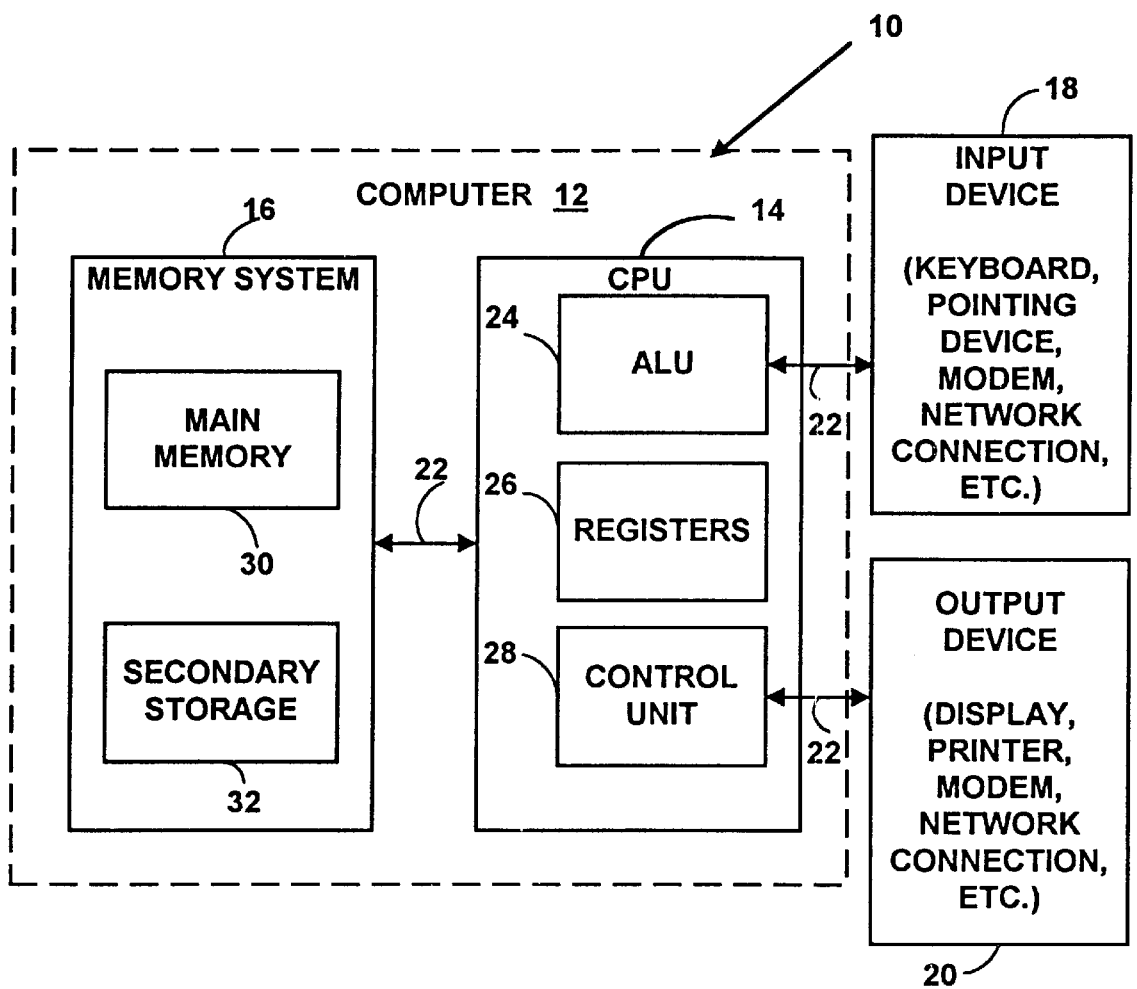
FIG. 1 is a block diagram of a computer system used to implement a preferred embodiment of the present invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g. a microphone, etc.), or any other device providing input to the computer system 10. The output device 20 can comprise a display, a printer, an audio device (e.g. a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as; well as other processing of signals. The memory locations where data bits are maintained are physical locations that have particular electrical, magnetic, optical, or organic properties corresponding to the data bits.

In the preferred embodiment of the present invention, the computer system 10, uses the Windows® 95 or the Windows NT™ client/server operating system by Microsoft Corporation of Redmond, Wash. However, other client,'server operating systems (e.g., OS/2®, by IBM, etc.) could also be used. A client/server operating system is an operating system which is divided into a plurality of processes of two different types: server processes, each of which typically implements a single set of services, and client processes, which request a variety of services from the server processes. Object oriented programming is used to design the client/server operating system, where objects represent system resources.

For example, the Windows® 95 client/server operating system provides shareable resources, such as files, memory, processes and threads, which are implemented as "objects" and are accessed by using "object services." As known in the art, an "object" is a data structure whose physical format is hidden behind a type definition. Data structures, also referred to as records or formats, are organization schemes applied to data so that it can be interpreted, and so that specific operations can be performed on that data. Such data structures impose a physical organization on the collection of data stored within computer memory 16 and represent specific electrical, magnetic or organic elements.

An "object type," also called an "object class," comprises a data-type, services that operate on instances of the data type, and a set of object attributes. An "object attribute" is a field of data in an object that partly defines that object's state. An "object service" implements and manipulates objects, usually by reading or changing the object attributes. "Object oriented design" is a software development technique in which a system or component is expressed using objects.

An object typically has two components: a function table, containing a pointer to each object member function (i.e. sometimes known as an object method) defined in the object's class, and a data block, containing the current values for each object variable (i.e. data members, sometimes known as an object property). An application has some reference to the object components through an object pointer. An application obtains this object reference by using a function call (direct or implied) in which that function allocates the object block in memory, initializes the function table, and returns the reference to said memory to an application.

The Windows® 95 and Windows NT™ operating system allows users to execute more than one program at a time by organizing the many tasks that it must perform into "processes." The operating system allocates a portion of the computer's resources to each process and ensures that each process's program is dispatched for execution at the appropriate time and in the appropriate order.

Processes are implemented as objects. A process object comprises the following elements: an executable program; a private address space; system resources (e.g., communication ports and files) that the operating system allocates to the process as the program executes; and at least one "thread of execution." A "thread" is the entity within a process that the operating system kernel schedules for execution. As is well known in the art, each thread has an associated "context", which is the volatile data associated with the execution of the thread. A thread's context includes the contents of system registers and the virtual address belonging to the thread's process. Thus, the actual data comprising a thread's context varies as it executes.

Figure 2:
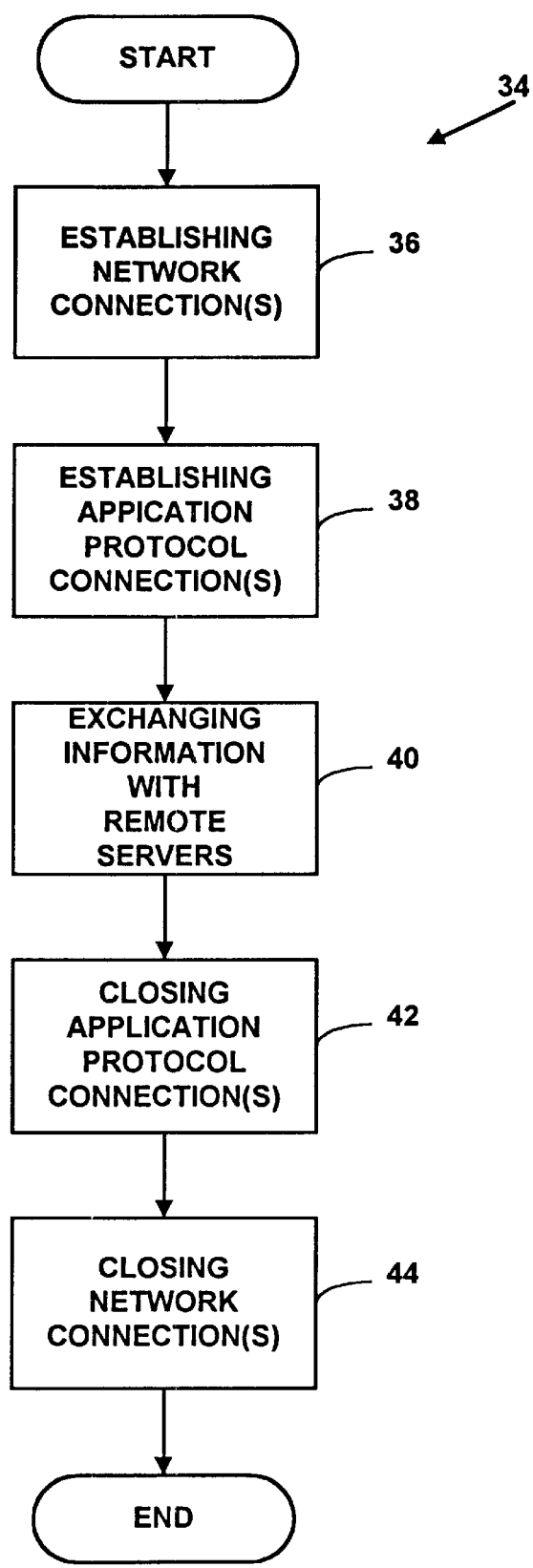
FIG. 2 is a flow chart illustrating a method of connection to and exchanging information with a computer network.

As is shown in FIG. 2, reentrant Internet API functions of the present invention provide a method 34 of connecting to and exchanging information with a computer network such as the Internet from a client application program. Reentrant functions are functions that can be repeatedly called from one or more application program without interference. However, the reentrant Internet API functions can also be used to connect to and exchange information with an intranet network of computers (e.g., a local area network). In general terms, the reentrant Internet API functions provide a method 34 which includes establishing network connection(s) 36, establishing application protocol session(s) to remote server application(s) 38, exchanging information with, and making requests of, remote server application(s) 40, closing application protocol session(s) 42, and closing the network connection(s) 44. More detail on the reentrant Internet API functions is provided below.

Figure 3:
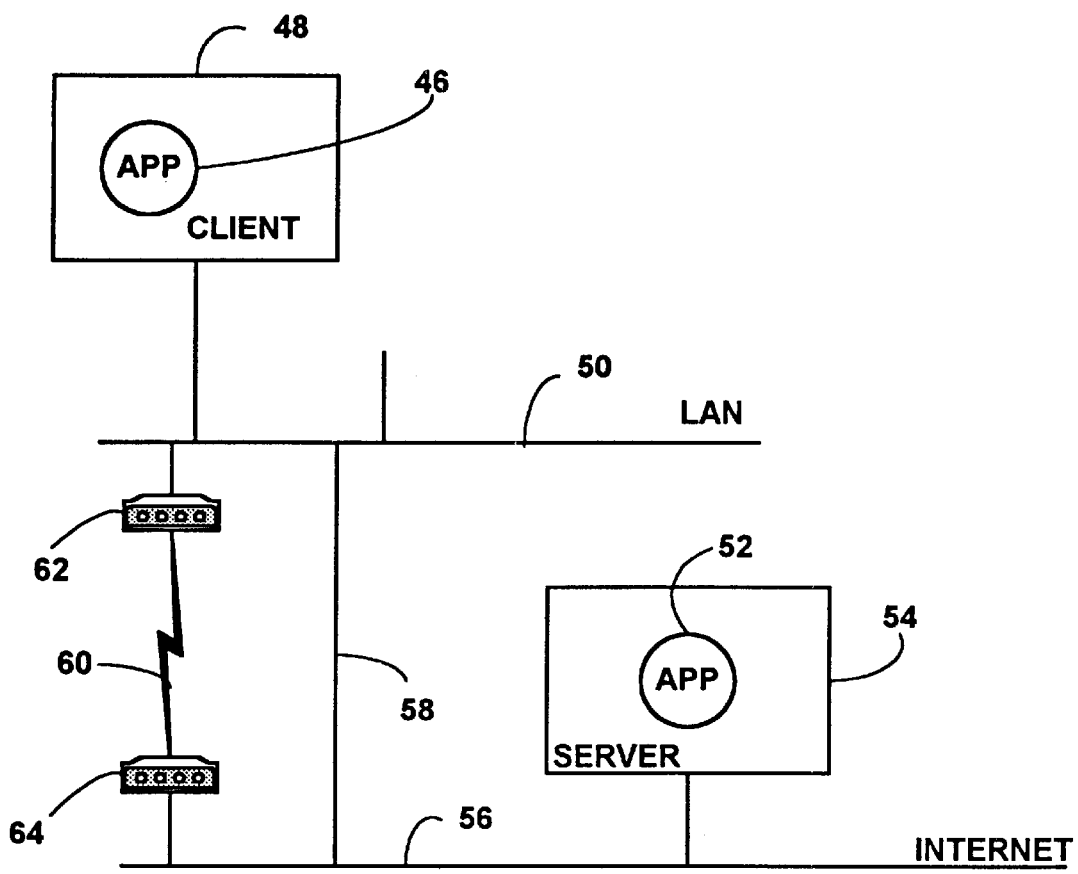
FIG. 3 is a block diagram illustrating a connection between a client application and a server application on a computer network.
Figure 7:
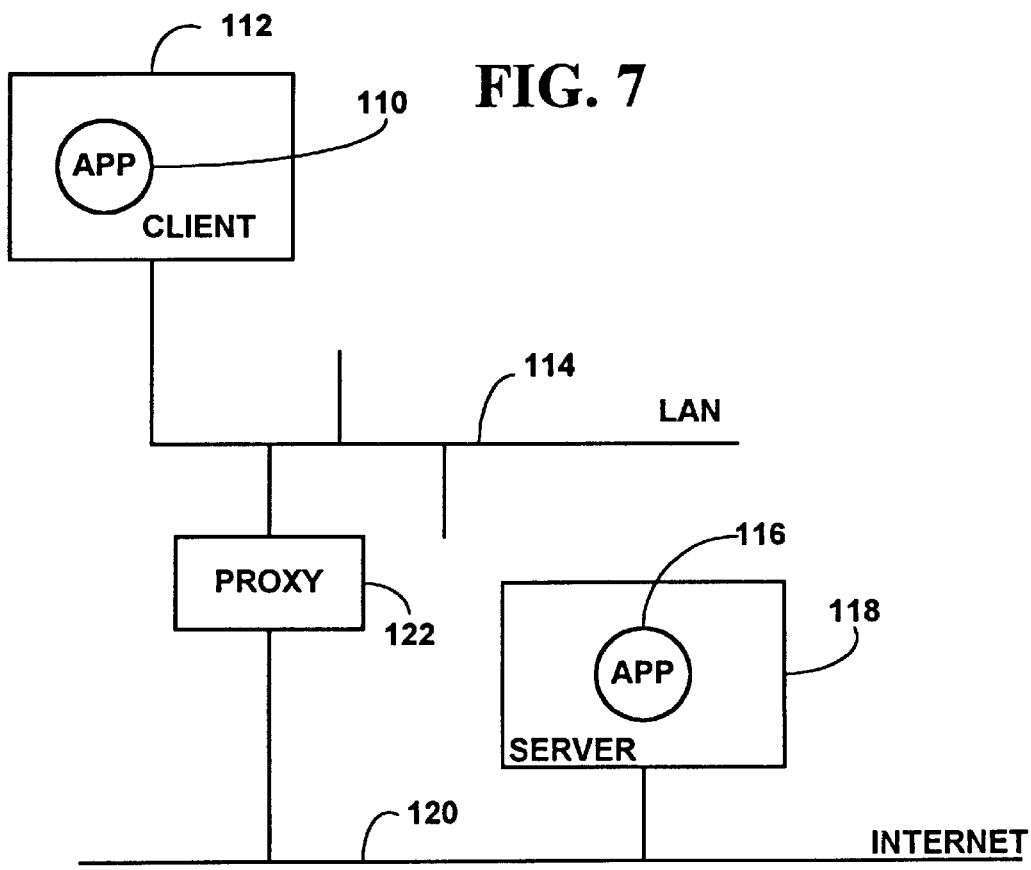
FIG. 7 is a block diagram illustrating the use of a proxy application in the preferred embodiment of the present invention.

As is shown in FIG. 3, a client application program 46 residing on a client computer 48 connected to a local area network (LAN) 50 desires to communicate with a server application 52 on a remote server computer 54 connected to a remote computer network such the Internet 56. The communications can be a direct connection 58, or the communications 60 can be achieved using a pair of modems (62,64) or some other communication devices (not shown in FIG. 3). The connection can also be through a proxy server as is shown in FIG. 7, and will be explained in detail below. The application program 46 achieves this communication with the reentrant function calls in the Internet API.

In general terms, Internet applications known in the art are organized into four conceptual layers of software over one layer of hardware. Starting with the fourth or highest layer, these layers are the application layer, which contains the application program or programs. Hereinafter the moniker "application" will be used to refer to an application program which is executed in one or more operating system processes or threads. Below the application layer is the transport layer, which is typically the Transmission Control Protocol (TCP) or User Datagram Protocol (UDP) layer, the network layer, which is typically the Internet Protocol (IP) layer, and the network interface layer, which is also called the data link layer. The hardware layer is underneath these four layers of software.

Services in each of the layers are available at Service Access Points (SAPs). Layer N+1 passes data to a lower layer N through a SAP. For example, the application layer (layer 4) passes data to and from the transport layer (layer 3) through a transport layer SAP.

Internet applications in accordance with the preferred embodiment of the present invention, include two conceptual layers of software over one layer of hardware. As is shown in FIG. 4A, the second or highest software layer is the application layer 66 in which an application is provided a SAP 68 to the Internet layer 70, which is the first or lowest conceptual software layer. There is also a SAP 72 between the Internet layer 70 and the hardware layer 74.

The two conceptual layers of software are implemented as computer software programs or processes that run under the Windows® 95 and the Windows NT™ operating systems. However, the implementation is not limited to Windows® 95 or Windows NT™ programs and processes, and can be used with other operating systems (e.g., OS/2® by IBM, etc.).

As is shown in FIG. 4B, the Internet layer 70 includes typical or normal Internet conceptual software layers such as the transport layer (e.g., TCP) 76, the network layer (e.g., IP) 78, and the network interface layer 80. The "normal" Internet conceptual software layers (76–80) are shown by dashed-line boxes within the Internet layer 70 in FIG. 4B.

There are also SAPs 82 and 84 between the "normal" Internet layers. Since the Internet layer 70 (FIG. 4A) abstracts or hides the details of the "normal" Internet layers 76–80 (FIG. 4B), there are only two conceptual layers of software included in the preferred embodiments of the present invention.

Figure 5:
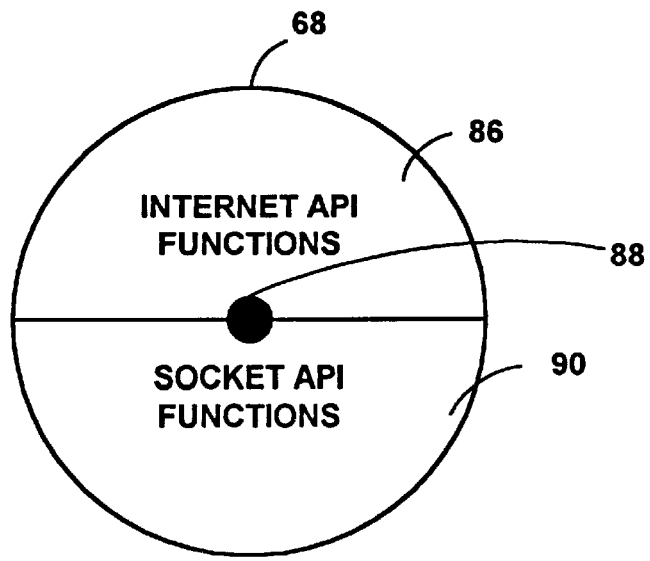
FIG. 5 is an expanded view of a service access point from the block diagram of FIG. 4A.

FIG. 5 shows a expanded view of the SAP 68 in the Internet layer 70 that is used by the application layer 66 to send and receive data from the Internet layer 70. In the preferred embodiment of the present invention, the application layer 66 is provided via the SAP 68 a set of reentrant functions (also called procedures, subroutines, etc., and hereinafter called functions) in an Internet API 86 included in a Windows® 95 dynamic link library file (DLL) called WININET.DLL. However, the Internet API functions could also be stored in other types of files with other names. Dynamic link library files provide reentrant function libraries that applications link to and call as regular function calls. The SAP 68 provides an additional software layer 86 between the application layer 66 and the transport layer 76 within the Internet layer 70.

Typically only one copy of any DLL is stored on a given computer. The functions on the DLL are called by any application which defines services provided by functions in the DLL. Dynamic link libraries are known and understood by those skilled in the art. In contrast, as is known in the art, standard libraries of functions can be created and linked to an application program. However, standard function libraries known in the art are typically not reentrant, and every application program which desires to use the standard function library links in its own copy of the function library. This significantly increases the overall size of the application program, and may result in multiple copies of the same function library linked to a number of different application programs. This wastes computer system resources (e.g., memory, secondary storage, etc.).

Functions in the WININET.DLL in the SAP 68 use sockets as a communication facility SAP 88 to communicate with the Internet layer 70. Sockets are an inter-process communication facility developed for the UNIX® operating system, and are known in the art. The socket functions 90 are included in a dynamic link library file called WSOCK32.DLL. The WSOCK32.DLL includes standard 32-bit socket functions, and a UNIX®-style sockets interface for networking. However, other communication facilities (e.g., named pipes, etc.) could also be used for the SAP 88, as well as other socket function libraries, file types and file names to store the socket functions.

The reentrant functions provide a clean and concise interface to the Internet or other computer networks (e.g., a Local Area Network or intranet) for an application program using file system semantics (e.g., InternetOpenUrl( ) ≈OpenFile( ), InternetReadFile( )≈ReadFile( ), InternetWriteFile ( )≈WriteFile( ), etc.). The reentrant Internet API have a logical syntax, functionality, structure and organization that parallels file system operations (ReadFile( ), WriteFile( ), OpenFile, CloseFile( ), etc.) that are well known in the art. The file system semantics used in the Internet API abstract a large number of network connection details to the level of file system commands. Thus, the Internet API functions allow a developer to focus on developing a networking application instead of handling all the network connection details.

This is not the case for other libraries of networking functions known in the art. These libraries which are not based on file system semantics require a developer to become familiar with and use a large number of unique function names to develop networking applications. For example, using the Internet API, a developer need only use and remember a single function call (e.g., FtpOpenFile( )) to open a FTP file on a computer network. However, a networking library not based on file system semantics may require the developer remember multiple function calls to open an FTP file. (e.g., individual function calls to set the directory access, set up the file open to use FTP protocol, set up file open format, etc.) In addition to remembering multiple function call names, the developer must manage the details (e.g., sending the proper arguments to each of the functions, checking the return value from each of the functions, handling errors, etc.) for each of the multiple function calls within the application being created if such libraries are used.

In contrast, the Internet API eliminates many of the problems just described by providing a limited number of reentrant functions calls based on file system semantics. In addition, a number of the Internet API functions provide multiple networking operations within a single networking function based on file system semantics. This further reduces the number of Internet API function calls a developer must remember or use to accomplish a desired goal in a networking application.

The reentrant functions (i.e., the Internet API functions) organized with file system semantics included within the WININET.DLL are shown in Table 1. A full explanation of each functions and its arguments can be found in Appendix A.

TABLE 1

| Reentrant Internet API Functions | Descriptions |
|---|---|
| GENERAL REENTRANT INTERNET FUNCTIONS | Using File System Semantics to parallel file system operations. |
| InternetOpen | Initializes the application's use of the reentrant Internet API functions. |
| InternetCrackUrl | Cracks a URL into its component parts. |
| InternetCreateUrl | Creates a URL from its component parts. |
| .InternetOpenUrl | Begins retrieving a FTP, Gopher, or HTTP URL. |
| ..InternetReadFile | Reads file data from the Internet. |
| ..InternetQueryDataAvailable | Determines amount of data to be read. |
| .InternetCloseHandle | Stops reading data from the handle. |
| .InternetSetStatusCallBack | Sets a function with status information for asynchronous and synchronous operations. |
| .InternetQueryOption | Queries the setting of an Internet option. |
| .InternetSetOption | Sets an Internet option. |
| FTP FUNCTIONS | |
| .InternetConnect | Opens an FTP session with an Internet server and logs on the user. |
| ..FtpFindFirstFile | Starts FTP file enumeration in the current FTP directory. |
| ...InternetFindNextFile | Continues FTP file enumeration. |
| ..InternetCloseHandle | End file enumeration in the current FTP directory. |
| ..FtpGetFile | Retrieves an entire file from the FTP server. |
| ..FtpPutFile | Writes an entire file to the FTP server. |
| ..FtpDeleteFile | Deletes a file on the FTP server. |

TABLE 1-continued

| Reentrant Internet API Functions | Descriptions |
|---|---|
| ..FtpRenameFile | Renames a file on the FTP server |
| ..FtpOpenFile | Initiates access to a file on the FTP server for reading or writing. |
| ...InternetReadFile | Reads data from an open FTP file. |
| ...InternetWriteFile | Writes data to an open FTP file. |
| ..InternetCloseHandle | Ends reading/writing to/from a file on the FTP server. |
| ..FtpCreateDirectory | Creates a new directory on the FTP server. |
| ..FtpRemoveDirectory | Deletes a directory on the FTP server. |
| ..FtpSetCurrentDirectory | Changes the client's directory on the FTP server. |
| ..FtpGetCurrentDirectory | Returns the client's current directory on the FTP server. |
| ..FtpCommand | Issues a command to the FTP server. |
| ...InternetGetLastResponseInfo | Retrieves the text of the FTP server's response to a FTP command. |
| .InternetCloseHandle | Indicates the application is no longer interested in the FTP server. |
| GOPHER FUNCTIONS | |
| .InternetConnect | Indicates the Gopher server the client application is interested in accessing. |
| ..GopherFindFirstFile | Starts enumerating a Gopher directory listing. |
| ...InternetFindNextFile | Continues the Gopher directory enumeration. |
| ..InternetCloseHandle | Terminates the Gopher directory enumeration. |
| ..GopherOpenFile | Starts retrieval of a Gopher object. |
| ...InternetReadFile | Reads data frotn a Gopher object. |
| ..InternetCloseHandle | Completes the reading of a Gopher object. |
| ..GopherCreateLocator | Forms a Gopher locator for use in other Gopher function calls. |
| ..GopherGetAttribute | Retrieves attribute information on the Gopher object. |
| .InternetCloseHandle | Indicates the application is no longer interested in the Gopher server. |
| HTTP FUNCTIONS HTTP (Plug In Authentication Model) | |
| ..AuthenthicateUser | Called on receipt of a HTTP "Access Denied" to verify a challenge. |
| ..preAuthenticateUser | Called before sending a HTTP request. This function determines what authentication header may be needed, and returns it. |
| **unloadAuthenticateUser | Indicates the completion of a HTTP session. This allows memory to be freed. |
| HTTP (World Wide Web) | |
| .InternetConnect | Indicates the HTTP server the application is interested in accessing. |
| ..HttpOpenRequest | Opens an HTTP request handle. |
| ...HttpAddRequestHeaders | Adds HTTP request headers to the HTTP server object. |
| ...HttpSendRequest | Sends the specified request to the HTTP server. |
| ....InternetReadFile | Reads a block of data from an outstanding HTTP request. |

TABLE 1-continued

| Reentrant Internet API Functions | Descriptions |
| --- | --- |
| ...HttpQueryInfo | Queries information about an HTTP request. |
| ..InternetCloseHandle | Closes an open HTTP request handle. |
| .InternetCloseHandle | Indicates the application is no longer interested in the HTTP server. |
| GENERAL INTERNET FUNCTIONS | |
| InternetCloseHandle | Terminates the Internet connection for an application which had an FTP, Gopher, or HTTP session (closes the handle returned from InternetOpen()). |

As can be seen in Table 1, the Internet API functions use file system semantics (e.g., prefixReadFile( ), prefixGetFile( ), prefixPutFile( ), prefixWriteFile( ), etc. where prefix is Internet, Ftp, Gopher, Http, etc.). The file system semantics help make the arrangement of the Internet API functions logical, familiar, and easy for a software developer to use. The Internet API includes general Internet related functions, FTP related functions, Gopher related functions and HTTP related functions based on file system semantics.

Table 1 also shows the hierarchical relationships between the functions. The function hierarchy is the result of defining a number of independent and dependent functions returning Internet handles. The function hierarchy provides a concise way to manage a large number of networking details by propagating access to networking data to the next lower function level through the Internet handle.

The function hierarchy is shown in Table 1 by preceding dependent functions with a series of dots. The highest level, or independent functions have no preceding dots. 1st level dependent functions are preceded by one dot, 2nd level dependent functions by two dots, etc. The root, or highest level independent function used to initialize an Internet session is InternetOpen( ). The InternetCloseHandle( ) function is a multi-level function that can be called at the independent level, or any dependent level. The function hierarchy is the result of functions at each level returning Internet handles which must be sent to the next lower level. Internet handles will be explained in detail below.

As an example, InternetConnect( ), which is a first level dependent function, cann ot be called until InternetOpen( ) (an independent function) is first called and returns a valid Internet handle, which is a required argument for InternetConnect( ) call. If an application desires to find the first file located during an FTP session with a connection to the Internet, InternetOpen( ) is called and the Internet handle that is return ed is used as an arg um ent for a call to InternetConnect( . . . ,FTP, . . . ) to establish an FTP application protocol session. Finally, the Internet handle returned from InternetConnect( ) is used as an argument in a call to FtpFindFirstFile( ). Other dependent functions use handles from the next higher level in a similar manner.

Internet API Function Handles

A successful return from a reentrant Internet API function shown in Table 1 returning handles (e.g.,InternetOpen( )), returns a valid Internet handle of type HINTERNET to the calling application. The Internet handle is similar but not the same as a native API handle typically returned by an Windows Win32 API. Win32 APIs 32-bit Windows functions and are known in the art. A native API handle is an opaque data type which is used as index into an application specific object table. An application's object table contains pointers to all the objects the application knows about (i.e., the objects being tracked or monitored by the application).

An Internet handle of type HINTERNET is an opaque data type used as an index to an Internet application specific object table. However, the Internet handles are not the same as native API handles. That is, an application cannot access any internal data or data structures associated with the Internet handles. In addition, Internet handles cannot be used in native API function calls which require a native handle, and a native API handle cannot be used in the Internet API function calls which require an Internet handle.

Figure 6A:
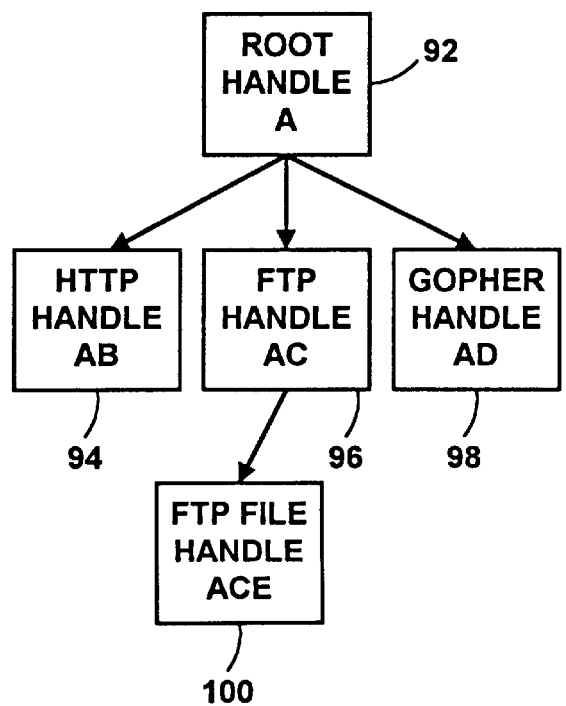
FIG. 6A is a block diagram illustrating the handle hierarchy in the preferred embodiment of the present invention.

Internet handles have a handle inheritance hierarchy. As each additional Internet handle is created, it inherits access to the Internet handle data of its parent. For example, an application that calls InternetOpen( ) to initialize an Internet session, then calls InternetConnect( ) three times, once each to create a HTTP session, FTP session and a Gopher session. The independent handle returned from independent function InternetOpen( ) is designated the "Parent" handle, and is the "root" 92 of a tree of Internet handles with handle data set A as is shown in FIG. 6A. The three dependent handles returned from the calls to the first level dependent function InternetConnect( ), the HTTP handle 94, the FTP handle 96, and the Gopher handle 98 are "children" of the root handle. The three dependent handles 94–96 returned from InternetConnect( ) with handle data sets B–D inherit access to all the data stored in the parent handle or independent handle (i.e., handle data set A) and are represented as handle data sets AB, AC, and AD, respectively. If a call was then made to the Internet FTP function FtpFindFirstFile( ) (see Appendix A for details), which begins searching the current directory of the given FTP session and returns a Internet FTP file handle 100. This FTP file handle 100 is a "child" of the FTP handle 96 (and a "grandchild" of the root handle 92) and inherits access to all the handle data (i.e., handle data set ACE) stored for the root (handle data set A) handle and the FTP handle (handle data set AC).

Figure 6B:
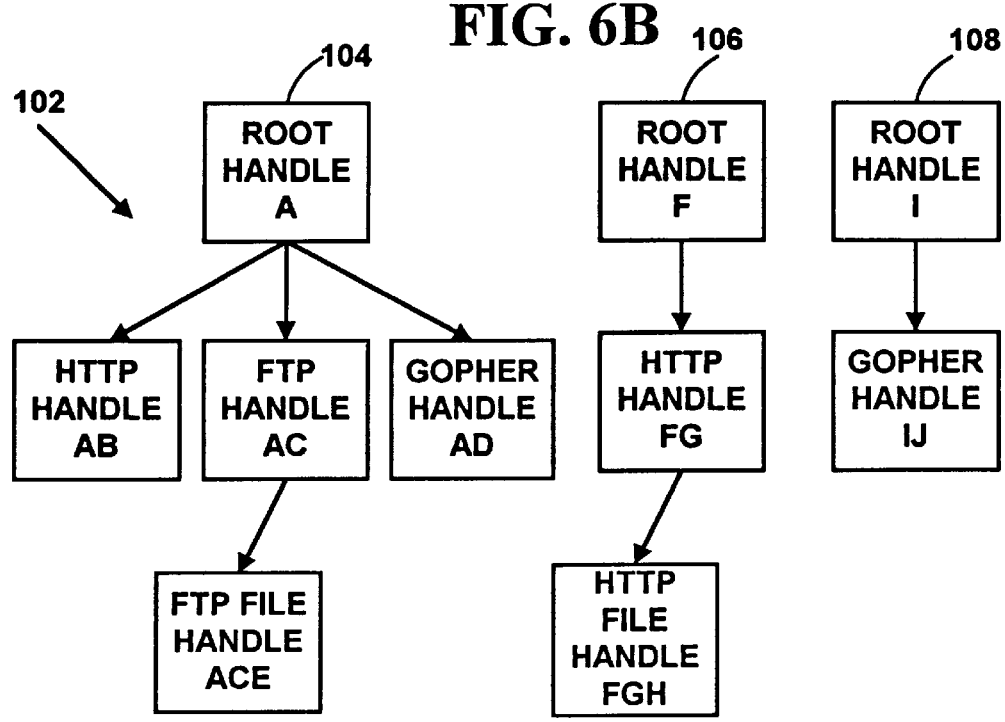
FIG. 6B is a block diagram further illustrating the handle hierarchy.

As is shown in FIG. 6B, multiple calls can be made to the InternetOpen( ), and multiple calls can be made to the independent function InternetConnect( ) and to other dependent Internet API functions to create a "forest" 102 of Internet handle trees (104–108). Each Internet handle below the root handle will inherit access to data from the Internet handle above it. Thus, an N-level dependent function can access networking data from the N-1 dependent functions and the independent function(s) above it through the Internet handle, thereby eliminating a significant amount of data management overhead.

Multithreaded Access to Internet API Functions

A reentrant function is a function that can be called multiple times, by multiple applications without interference. The reentrant Internet API functions allow multi-threaded access and are reentrant in the sense that there can be multiple calls to an individual Internet API function from different operating system threads being executed for multiple applications. The individual Internet API functions complete any necessary synchronization. However, multiple simultaneous calls using the same Internet connection from the same application can lead to unpredictable results.

For example, if an application has used the Internet API function FtpOpenFile( ) to begin downloading a file from a FTP server, and two operating system threads for the application simultaneously make calls to the function InternetReadFile( ), there is no guarantee which call will be completed first. There is also no guarantee for the order of the data returned to each thread. Applications which use multiple threads for the same Internet connection are responsible for synchronization between threads to ensure a predictable return of information.

Internet API Function Error Handling

The Internet API functions return error information in the same way as other native API functions. Return values tell whether the function is successful or not, either by returning a Boolean value where TRUE indicates success and FALSE indicates failure, or by returning a handle of type HINTERNET. With HINTERNET, a NULL value indicates failure. Any other value indicates a successful call.

If an Internet API function call fails, the application can call the Win32 GetLastError( ) function to retrieve the specific error code for the failure. If GetLastError( ) returns the ERROR_INTERNET_EXTENDED_ERROR value, the application can retrieve extended textual, information returned from the server by calling InternetGetLastResponseInfo( ) (see Appendix A). In most cases, extended error information is returned by the FTP and Gopher protocols Both GetLastError( ) and InternetGetLastResponseInfo( ) operate on a pre-thread basis. If two threads make Internet function calls at the same time, error information will be returned for each of the individual threads so that there is no conflict between the threads. However, only the thread which successfully made the call will receive the error information for the function.

Canceling Internet API Function Requests

The reentrant Internet API functions operate in a synchronous manner by default. However, the functions can be also used in an asynchronous manner as will be explained below. Sometimes, an application wishes to cancel an outstanding asynchronous request because of some additional input from a user. An asynchronous Internet request can be canceled by using the InternetCloseHandle( ) function to close the Internet handle associated with the outstanding request. Canceling a request in this manner will abort the connection to the server and require the application to re-establish the connection to the server by calling the proper Internet API function.

Internet API Unicode Support

All Internet API functions using string arguments on input or output have both American National Standards Institute (ANSI) and Unicode versions. As with all Windows® functions, the ANSI functions have "A" as the final character of their name while the Unicode functions have "W." In Windows® 95 and Windows NT™, both the ANSI and Unicode versions of the functions are implemented.

Since the underlying Internet protocols pass all information in Latin 1, the Unicode versions of the Internet API procedures must do translations to and from ANSI. Latin 1 is a standard similar to ANSI and is known in the art. In some cases, it is not possible to convert a Unicode string to ANSI, so the Unicode functions can fail. In the cases where the translation fails, there is usually no ANSI equivalent, so the requested object could not exist.

The Internet API functions do not translate sent or received content. For example, when calling a Unicode function to retrieve a file from an FTP server, the application must specify the filename in Unicode. However, the file data is returned to the application exactly as the FTP server has stored it.

Initializing an Internet Session

An application initiates an Internet session with a call to the function InternetOpen(lpszUserAgent, dwAccessType, lpszProxy,lpszProxyBypass,dwFlags). A complete explanation of the InternetOpen( ) function arguments can be found in Appendix A. The call to InternetOpen( ) initializes internal data structures, the type of network access desired and prepares for additional Internet function calls from the application. This one function call manages a large number of important details for the application, and is the highest level independent function.

The dwaccesstype argument allows the application to choose what type of Internet access the application will have by specifying an access type parameter. The application can have a direct connection to the Internet (e.g., a permanent network connection medium such as an Ethernet local area network (LAN) which is connected to an Internet host computer) by using the INTERNET_OPEN_TYPE_DIRECT parameter. If the INTERNET_OPEN_TYPE_PRECONFIG parameter is used for the dwaccesstype argument, the network access application type is identified with an entry in the operating system registry. The registry is a hierarchical database of keys and values that stores information describing a computer system's hardware, user preferences, available application programs, and other configuration data, as is known in the art. The InternetOpen( ) function will query the operating system registry to locate the access type which will be used.

The communications application identified in the operating system registry may use a modem and standard modem protocol to dialup and communicate with an Internet host (see FIG. 3). However, the modem protocol typically provides access to only a subset of the available Internet protocol services. The communications application may also use a modem and the Serial Line Protocol (SLIP) or the Point-to-Point Protocol (PPP) to connect to the Internet host. SLIP and PPP allow two computers to communicate using TCP/IP over a standard dialup phone line and typically provide full access to the set of available Internet protocols and services.

If the INTERNET_OPEN_TYPE_PROXY parameter is used for the dwaccesstype argument, then the application can automatically build in an Internet "firewall" or a level of security into the Internet session by using a proxy application. This parameter is typically used when an application is accessing the Internet from a computer on a private LAN that is not directly connected to an Internet host. The operator of the private LAN (e.g., a business) may desire to provide an initial level of security to protect the private LAN by using a proxy application which examines all requests incoming from and outgoing to the Internet.

The use of a proxy application is shown in FIG. 7 (compare this to FIG. 3). A client application 110 on a local computer 112 connected to a private LAN 82 desires to access a server application 116 on a remote computer 118, which is connected to the Internet 120 and is an Internet host. When the client application 110 makes a request for information from the server application 116, the request is first sent to the proxy application 122 before being sent out on the Internet.

The name of the preferred proxy is set with the lpszProxy argument. The preferred proxy is typically specified using Uniform Resource Locator (URL) syntax in the format "protocol://proxy:port" (e.g., http://proxy:80, in which the value represented a typical port designation used for Internet access). However, the protocol and the port are optional.

The operator of a private LAN can also selectively limit Internet access with the lpszProxyByPass argument. The lpszProxyByPass argument is used to provide a list of server applications on the Internet for which requests are to be sent via the proxy application a list of 122 and requests which can be sent directly to the Internet 120. The proxy application 122 can prohibit any application from sending requests to or receiving from the Internet at all by intercepting all Internet requests (e.g., the INTERNET_OPEN_TYPE_PROXY parameter is used for the dwAcessType argument and the lpszProxyByPass argument is an empty list).

If the proxy application 122 allows the client application 110 to make a request to the server application 116 on the Internet 120, the proxy 122 verifies the integrity of the requested data which it is returned from the server application 116. For example, the data can be scanned for viruses, the data can be authenticated using a digital signature or other secure communications technology, etc. Thus, the proxy application 122 provides a first level of security for data leaving from and returning to client application 110.

The dwflags argument is used to indicate the use of two options, asynchronous function operations and internal caching of data received from the Internet. If the dwflags argument is set with the INTERNET_FLAG_ASYNC parameter, then function calls in the Internet API will operate in an asynchronous manner.

Figure 8:
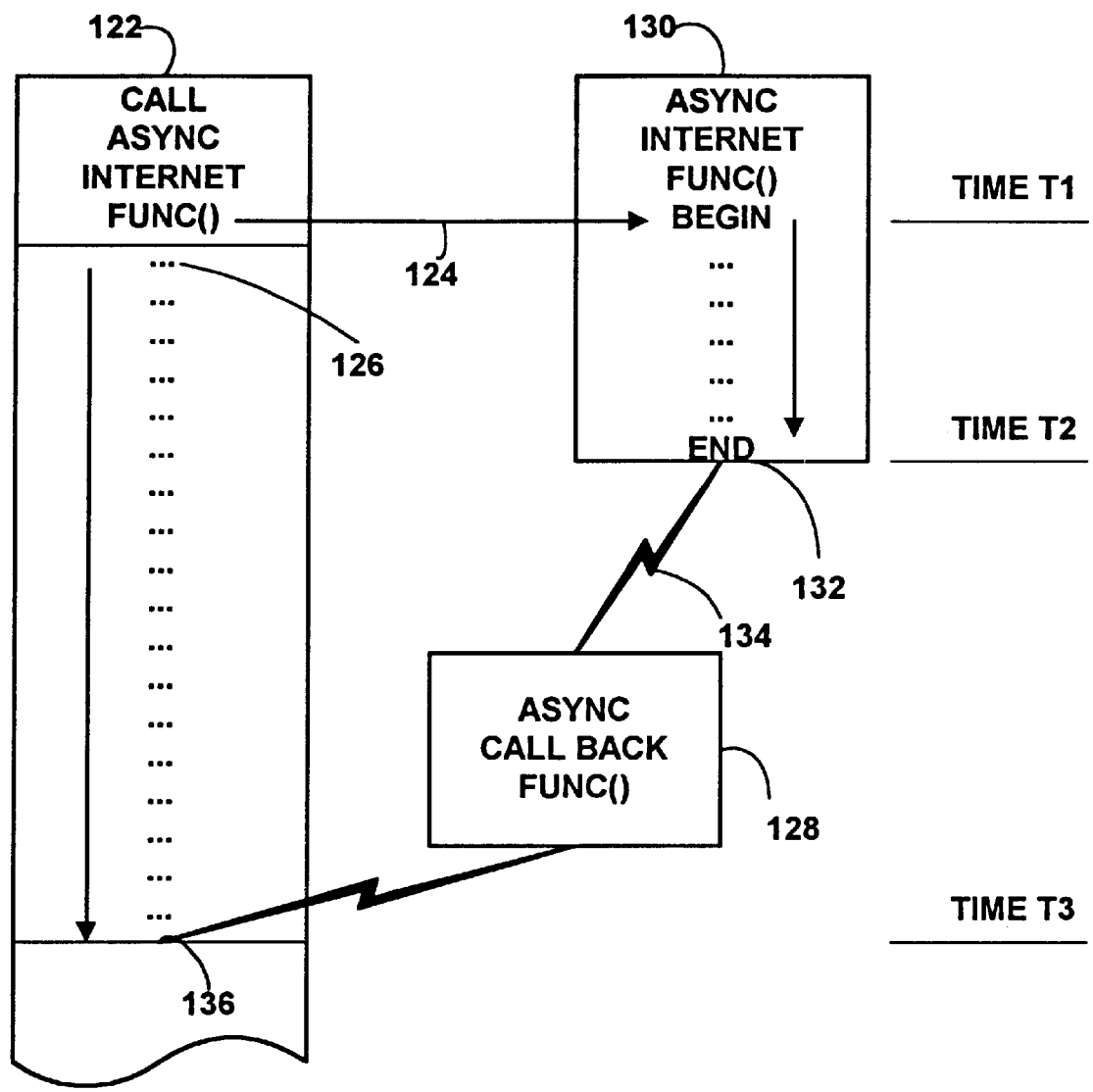
FIG. 8 is a block diagram illustrating an asynchronous function call for the preferred embodiment of the present inventions.

Most function calls are synchronous, and the Internet API function calls are operated in a synchronous manner by default. When a synchronous function call is made, the application making the function call is blocked from further execution until the function call completes. If a function operates in an asynchronous manner as is shown in FIG. 8, an application 122 can make a function call 124 at time T1 and continue executing other functions or instructions 126. A call back routine 128 is typically defined for an asynchronous function 130. When the asynchronous function call has finished execution 132 at time T2, the call back routine 128 will be contacted 134 by the asynchronous function 130 with the results. The execution of the application 122 is preempted at time T3 136. The preemption is done by executing an operating system thread for the call back routine 128, and preempting an operating system thread executing for the application 122.

The Internet API provides a function call to set up call back routines (see, e.g., InternetSetStatusCallback( ) in Appendix A) for asynchronous function operation. A single operating system thread is used to handle all asynchronous Internet API function operations. However, multiple operating system threads could also be used.

Most of the reentrant functions in the Internet API perform multiple individual operations on the network. Each individual operation takes time to complete, and each individual operation can fail at any point. If asynchronous operations are used, then an application can make a function call and continue other operations without being blocked awaiting completion of individual operations in the function call.

For example, it is often desirable for an application to display processing status (e.g., graphics or text displays showing the percentage of completion for an operation, explanation of pending operations, etc.) for long-term operations (e.g., downloading a large image file). Displaying process status is very difficult in an environment that does not allow asynchronous function calls. Thus, the ability for an Internet function to perform asynchronous operations significantly improves the application's response to user inputs and to responses sent to or from the Internet.

If the dwflags argument is set with the INTERNET_FLAG_CACHE flag, then any information obtained from the Internet will be stored in an internal cache in memory. However, the cache may also be secondary or external storage (e.g., a hard disk, etc.). The size of the cache can be configured by the application program, or a default cache size used (e.g., 10% of the available storage on a hard disk, etc.). The internal cache will store the most recent data obtained at the top of the cache. Cache data at the bottom of the cache is eventually overwritten as new data is stored at the top of the cache. The internal cache is a beneficial feature when the application is an Internet browser. For example, a user may make a number of Internet requests, and the data that is returned from the Internet is stored in the cache. If the user desires to re-visit some the information stored in the cache, an additional Internet access is not necessary since the requested data is stored in the cache. The cache significantly improves the performance of applications such as Internet browser that make frequent Internet requests by reducing unnecessary accesses to the Internet.

Establishing an Internet Application Protocol Session

As was just described, a single call to the InternetOpen( ) function from the Internet API provides a client application with the ability to select the type of Internet access, select a proxy for a first level of security, select asynchronous behavior for function calls, and select internal caching. The single call to InternetOpen( ) initializes an Internet session for the application.

After a successful call to InternetOpen( ), an application uses the independent Internet handle returned from InternetOpen( ) and calls the InternetConnect (hInternetSession,lpszServerName, nServerPort, lpszUserName,lpszPassword,dwService, dwflags, dwcontext) function to open a HTTP, FTP, or Gopher Internet application protocol session. However, the list of Internet application protocols is not limited to HTTP, FTP, and Gopher. A session using other Internet application protocols (e.g., SMTP) can also be started by calling additional reentrant functions. A complete description of the InternetConnect( ) function argument data types can be found in Appendix A.

HTTP is a protocol used to access information on the World Wide Web. The World Wide Web is an information service on the Internet containing documents created in the Hyper Text Markup Language (HTML). HTML allows "links" to other documents, which may found on other Internet host computers. The HTML document links may use HTTP, FTP, Gopher, or other Internet application protocols, to retrieve the remote information pointed to by the link.

FTP is used to move files from one computer to another. FTP operates independently of where the computers are located, how they are connected, or even whether they are using the same operating system. Provided both computers can "talk" FTP and have access to a mutually common network, FTP can be used to transfer files.

Gopher allows an application to browse Internet resources using menus. The Gopher menus allow browsing of Internet resources regardless of their type. A Gopher user need not specify formal Internet details (e.g., domain names, IP addresses, etc.) to find desired information.

Returning to the InternetConnect( ) function call, the Hinternetsession argument is the independent Internet handle returned by the call to InternetOpen( ). The lpszServerName argument points to a null-terminated string that specifies the host name of an Internet server (e.g. "microsoft.com"). Alternatively, the string can contain the IP address of the site in ASCII text, in a dotted-decimal format (e.g., "11.0.1.45")

The Nserverport argument designates the network connection protocol port on the server to connect to. The default is a TCP/IP port designation. However, other transport (e.g., UDP, Internet Packet Exchange (IPX)) and network protocols (e.g., Sequenced Packet Exchange (SPX)) can also be used as will be explained below. If transport and network protocols other than TCP/IP are used, this parameter would designate a network connection protocol port for the desired protocol.

The lpszUserName argument points to a null-terminated string that specifies the name by which the user is to login with the server. If NULL, an appropriate default is used. For example, the FTP protocol, the default username is "anonymous."

The lpszPassword argument points to a null-terminated string that specifies the password to use to login. If both lpszUsername and lpszPassword are NULL, the default "anonymous" password is used. In the case of FTP, the default anonymous password is the user's electronic mail (e-mail) name. If lpszPassword is NULL but the lpszUsername is not NULL, a blank password is used. Table 2 describes the behavior for the four possible settings of lpszUsername and lpszPassword. However other combinations of settings may also be used.

TABLE 2

| lpszUsername | lpzaPassword | Username sent to FTP server | Password sent to FTP server |
|---|---|---|---|
| NULL or " " | NULL or "" | "anonymous" | User's e-mail name |
| Non-NULL string | NULL or " " | lpszUserName | " " |
| NULL | Non-NULL String | ERROR | ERROR |
| Non-Null String | Non-NULL String | lpszUserName | lpszPassword |

The dwservice argument defines the service to access. The services include INTERNET_SERVICE_FTP, for FTP access, INTERNET_SERVICE_GOPHER, for Gopher access, and INTERNET_SERVICE_HTTP for HTTP access. However, the services are not limited to this list and other services (e.g., SMTP) can also be supported.

The dwflags argument specifies the flags specific to the service used, and the dwcontext argument is an application defined value that is used to identify the application context for the handles returned by an asynchronous status call back routine. These arguments are described in greater detail in Appendix A.

A successful return from InternetConnect( ) returns a valid dependent Internet handle to an application protocol session (e.g., HTTP, FTP, Gopher, etc.). If the connection attempt fails, a NULL handle is returned. The returned dependent Internet handle is then used in subsequent lower level dependent Internet API function calls that provide the application protocol functionality.

The dependent function InternetConnect( ) is called before communicating with any Internet application service. For selected application protocols (e.g., FTP) InternetConnect( ) actually establishes a connection with an Internet application server. For other application protocols (e.g., Gopher), the actual connection is not established until the client application requests a specific transaction.

An application can initialize multiple Internet sessions with multiple calls to InternetOpen( ). The application can start multiple Internet application protocol sessions for each initialized session with multiple calls to InternetConnect( ), as was explained above. However, the application must manage internally the Internet handles returned.

With a single application protocol connection function which manages the details for the network connection and application connection protocols, even those which do not use persistent connections, an application can communicate common information about several requests using a single function call. In addition, this single application protocol connection function call provides flexibility for adding new or additional Internet application protocols. To support a new or additional application protocol would require additional values for the InternetConnect( ) parameters for use by an application. However, the function call and the number of arguments would remain the same and provide a consistent interface for applications.

With just two function calls, InternetOpen( ) and InternetConnect( ), an application can initialize an Internet session with a number of selected features (e.g., use a proxy, cache, asynchronous functions, etc.) and open an .nternet session using a specific network connection and application connection protocol (e.g., HTTP, FTP, Gopher, etc.). A large number of details including establishing/terminating network and application protocol connections, filing data structures, setting flags, setting timers, creating data packets, sequencing data, sending/receiving data, error handling for bad or incomplete data are automatically managed for the application. The application is relieved from the burden of creating, debugging, or providing source code to manage all of this underlying functionality, making the application smaller and easier to create, debug, and modify.

After calling InternetOpen( ) and InternetConnect( ), the application uses the Internet handles returned to make subsequent Internet API function calls using the hierarchy shown in Table 1. The application will make selected Internet API function calls depending on what the application is trying to accomplish. Each function call is described in greater detail in Appendix A.

When the application is finished with its Internet session, InternetCloseHandle(HINTERNET) is called to terminate the Internet session and free any allocated resources. The argument HINTERNET is any Internet handle returned from any of the Internet API function calls which return a handle. If a handle is closed while there is still activity on the function call that provided the handle, the activity will be aborted. The independent Internet handle (e.g., from the call to InternetOpen( )) all dependent Internet handles must be closed. Failure to close valid Internet handles returned from the Internet API functions can result in stranded resources and open connections or sessions on the Internet.

Using the Internet API Function Calls from an Application

Figure 9:
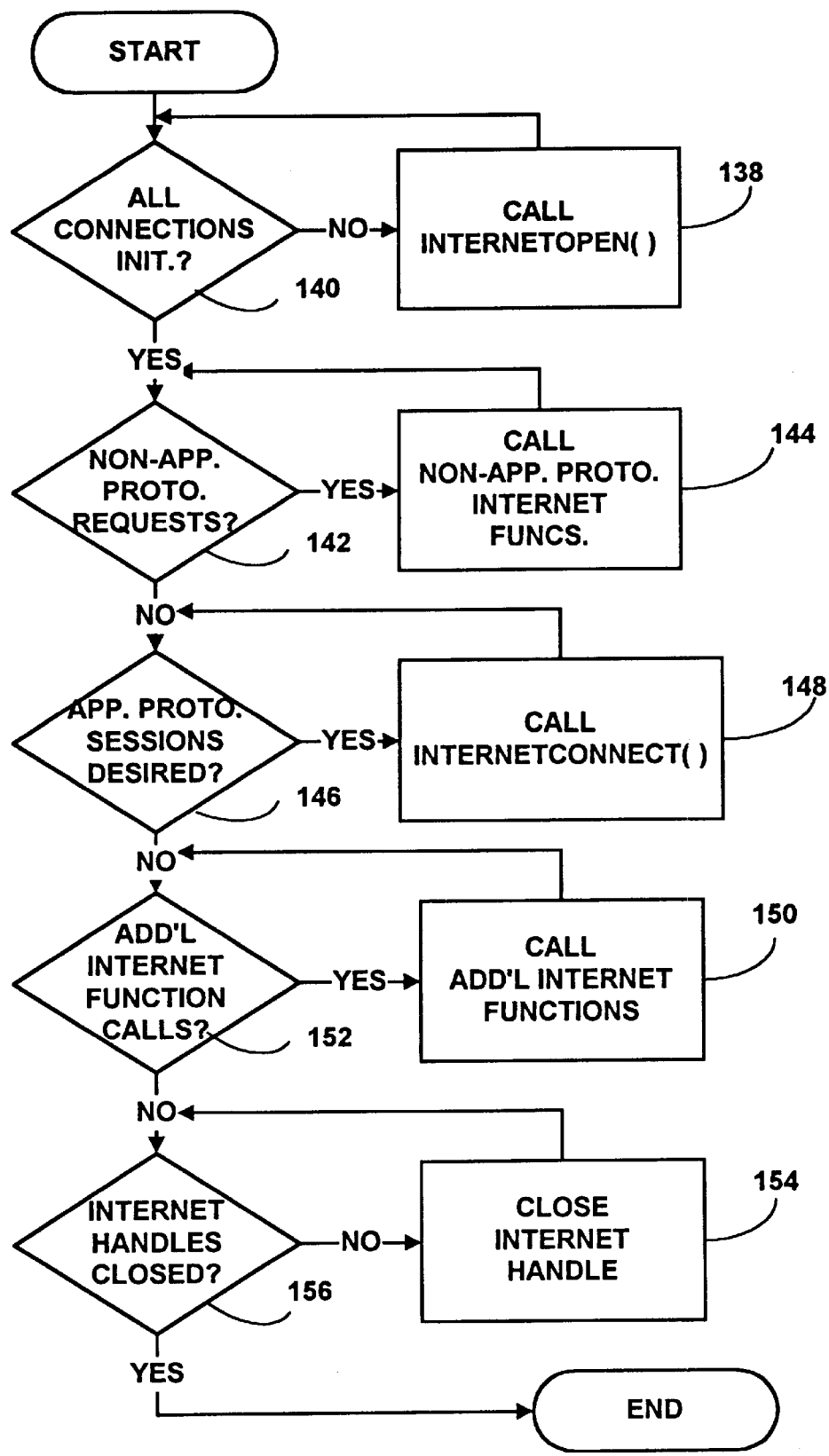
FIG. 9 is a flow chart illustrating communications with a network using the preferred embodiment of the present invention.

The flow chart in FIG. 9 shows the sequence of steps for using the reentrant Internet API function calls from an application. Function calls to InternetOpen( ) 138 are made to initialize as many network connections as desired 140. Any Internet API functions calls (e.g., InternetSetOption( ), etc., see Table 1 which do not require an established Internet application protocol session 142 can be executed (if any) 144 after the call(s) to InternetOpen( ). If an Internet application protocol session is desired 146, then a call is made to InternetConnect( ) 148 to create each of the desired application protocol session(s) (e.g., HTTP, FTP, Gopher, etc.). Multiple application session function calls (including, InternetOpen( ), any of the other Internet API functions calls which do and do not require an established Internet application protocol session, not shown) are made (150–152).

When the application is finished calling the reentrant functions in the Internet API, the function InternetCloseHandle( ) is called until all the Internet handles returned from any of the Internet API function calls are closed (154–156).

Transport and Network Layer Support

The Internet API also allow an application to use a variety of transport and network protocols to communicate with the Internet, and other computer networks. TCP/IP is the default transport/network protocol suite for communications with computers on the Internet. However, other protocol suites such the Network BIOS Extended User Interface(NetBEUI) by IBM® Corporation, Internet Packet Exchange/Sequenced Packet Exchange (IPX/SPX) by Novell® corporation, DECnet, by Digital® Equipment Corporation, NetBIOS by Microsoft Corporation, and OSI/TP-4 could also be used. In addition UDP/IP can be used to provide an unreliable (i.e., no guaranteed delivery of data packets) byte-stream-orientated, connectionless (i.e., no virtual circuit) transport/network protocol suite for data transfer. The underlying transport/network protocols are chosen by an application using the appropriate function calls. For example, the function call InternetConnect( ) can be used setting the Nserverport argument to a port for the appropriate underlying transport/network protocol suite. However a separate reentrant Internet API function call (not shown in Appendix A) could also be used to provide change the underlying transport/network protocol suite (e.g., InternetTransport( ), etc.).

Using the Internet API Functions for "Intranet" Communications

The reentrant Internet API functions provide a large amount of flexibility for creating applications that will communicate with computers on the Internet. However, the Internet API functions are not limited to creating applications only for the Internet. The Internet API functions can also be used to create applications which communicate with servers on a LAN, (sometime referred to as "intranet" communications).

For example, the reentrant Internet API applications can be used to allow the client application 46 on the local computer 48 shown in FIG. 3, to communicate with multiple servers (not shown) on the LAN 50. The servers may understand HTTP, FTP, Gopher, etc., or any combination thereof. In addition, since the transport/network protocol suite can be configured by an application to use a protocol suite other than TCP/IP, a variety of LAN applications can be developed. Thus, the Internet API functions can be used to create Internet, and well as intranet, applications.

Internet API Function Security Features

The proxy application described above provides a first level of network security. Several additional layers of security are also available from the reentrant Internet API function calls. Since sockets are used as the SAP between the Internet API functions and the Internet layer, a secure sockets layer (SSL) can be used to send encrypted socket data to the transport layer. The SSL uses RSA encryption to encrypt/decrypt data sent through a socket. The use of SSL is known by those skilled in the art. To use SSL, however, the application must be in communication with a server application that also understands and "talks" SSL.

In addition to the SSL, the Internet API functions can also use Private Communications Technology (PCT) by Microsoft Corporation to send secure information through sockets. PCT is small superset of SSL with additional security feature enhancements provided by Microsoft.

An application can also select secure transport of data from a Uniform Resource Location (URL). For example, to make a secure HTTP request, the prefix of the URL would be "https://". The extra "s" after the "http" says use secure transport for any data sent/received by an HTTP request. The default security for an application (if any) is configured by the user. Encryption/decryption of data can be used in SAPs and other layers in the conceptual scheme for the preferred embodiment of the present invention.

The security features are chosen by an application using the appropriate function calls from the Internet API (e.g., setting the dwaccesstype and calling InternetOpen( ), etc.). However separate reentrant Internet API function calls (not shown in Appendix A) could also be used to provide security features (e.g., InternetSecurity( ), etc.).

HTTP Authentication Support

The Internet API provides a HTTP authentication plug-in interface for extensions to the "basic" HTTP authentication scheme. By exposing a user defined DLL with three exported public functions, a developer can authenticate other forms of standard HTTP authentication. The operating system registry is used to track which DLLs are installed and what authentication protocols they support.

Use of the Internet API Function Calls

In the preferred embodiment of the present invention, the reentrant Internet API functions are used to simplify the development of an Internet browser, such as the Microsoft Internet Explorer® which runs under the Windows® 95 operating system. However, the Internet API functions are not limited to development of Internet browsers, and can be used for other Internet and intranet applications. In addition, the Internet API functions can be used from programming languages (e.g., Visual Basic® by Microsoft) from Windows® applications, and other non-windowed applications which may need a connection to the Internet or an intranet.

It should be understood that the programs, processes, and methods described herein are not related or limited to any particular type of computer apparatus, unless indicated otherwise. Various types of general purpose or specialized computer apparatus may be used with or perform operations in accordance with the teachings described herein.

In view of the wide variety of embodiments to which the principles of our invention can be applied, it should be understood that the illustrated embodiments are exemplary only, and should not be taken as limiting the scope of our invention. Rather, we claim as our invention all such embodiments as come within the scope and spirit of the following claims and equivalents thereto.

SL:nw, 3882-44391 MS 39335 3/27/96          Appendix A - 1

APPENDIX A

Internet API Functions

General Internet Functions

The General Internet Functions deal with basic internet file manipulation actions.

InternetOpen

The InternetOpen function initializes an application's use of the Internet functions.

HINTERNET InternetOpen(
    LPCTSTR *lpszUserAgent*,
    DWORD *dwAccessType*,
    LPCTSTR *lpszProxy OPTIONAL*,
    LPCTSTR *lpszProxyBypass*,
    DWORD *dwFlags*
);

Parameters

*lpszUserAgent*
    A string that identifies the name of the application or entity calling the Internet functions (for example, Microsoft Internet Browser). This name is used as the user agent in the HTTP protocol. It is added as the "User-Agent" header, unless the application overrides it by specifically adding a "User-Agent" header using the HttpAddRequestHeader() API.

*dwAccessType*
    The type of access required. These are the valid parameters:

| | |
    |---|---|
    | INTERNET_OPEN_TYPE_PRECONFIG | Preconfigured (registry) |
    | INTERNET_OPEN_TYPE_DIRECT | Direct to Internet |
    | INTERNET_OPEN_TYPE_PROXY | Through CERN proxy |

*lpszProxy*
    The name of the preferred CERN proxy if INTERNET_OPEN_TYPE_PROXY is requested. This is specified using the usual URL syntax, e.g. "http://proxy:80". The protocol ("http://") and port (":80") are optional

*lpszProxyBypass*
    A list of servers for which requests are sent directly, rather than via the proxy server.

*dwFlags*
    Used to indicate various options such as caching and asynchronous behavior. The possible values include:

SL:nw  3382-44391 MS 39335  3/27/96                    Appendix A - 2

| | |
|---|---|
| INTERNET_FLAG_ASYNC | Future operations on this handle may fail with ERROR_IO_PENDING. A status callback will be made with INTERNET_STATUS_REQUEST_COMPLETE. This callback will be on a thread other than the one for the original request. A status callback routine must be registered or the functions will be completed synchronously. |
| INTERNET_FLAG_CACHE | Cache information received from the Internet. |

Return Value

The InternetOpen function returns a valid handle which the application passes on to subsequent Win32 Internet functions. If InternetOpen fails, it will return a NULL value. The application can then retrieve a specific error code with the GetLastError function.

Remarks

The InternetOpen function is the first Win32 Internet function called by an application. It tells the Internet DLL to initialize internal data structures and prepare for future calls from the application. When the application is finished using the Internet function, it should call InternetCloseHandle to free the HINTERNET and any other resources.

If *dwFlags* includes INTERNET_FLAG_ASYNC, then all handles derived from this handle will have asynchronous behavior as long as a status callback routine is registered. In order for a function to be completed synchronously, the *dwContext* has to be set to zero for that call.

See Also

<u>InternetCloseHandle</u>

InternetCloseHandle

The InternetCloseHandle function is used to close any Internet handle opened by an application.

BOOL InternetCloseHandle(
   HINTERNET *hInet*
);

Parameters

*hInet*
   A valid Internet handle to be closed.

Return Value

If the handle was closed successfully, a value of TRUE is returned. If an error occurred, a value of FALSE will be returned. In this case, the application can call GetLastError to retrieve a specific error code.

Remarks

SL:nw 3382-44391 MS 39335 3/27/96                            Appendix A - 3

The InternetCloseHandle function is used to close all Internet handles (of the type HINTERNET) and free any resources associated with the handle. Pending operations on the handle are terminated and any outstanding data is discarded. If one thread is blocking a call to the Internet DLL, another thread in the application can call InternetCloseHandle on the Internet handle being used by the first thread to cancel the operation and unblock the first thread.

When an application has finished using the Internet DLL, it should use InternetCloseHandle to close the HINTERNET returned from InternetOpen.

See Also

<u>FtpFindFirstFile, FtpOpenFile, GopherFindFirstFile, HttpOpenRequest, InternetConnect, InternetOpen</u>

InternetConnect

The InternetConnect function opens an FTP, Gopher, or HTTP session for the specified site.

HINTERNET InternetConnect(
    HINTERNET *hInternetSession*,
    LPCTSTR *lpszServerName*,
    INTERNET_PORT *nServerPort*,
    LPCTSTR *lpszUsername*,
    LPCTSTR *lpszPassword*,
    DWORD *dwService*,
    DWORD *dwFlags*,
    DWORD *dwContext*
    );

Parameters

*hInternetSession*
    A handle to the current Internet session returned by InternetOpen.

*lpszServerName*
    This points to a null-terminated string that specifies the host name of an Internet server. Alternately, the string can contain the IP number of the site in ASCII dotted-decimal format (for example, 11.0.1.45).

*nServerPort*
    The TCP/IP port on the server to connect to. If *nServerPort* is INVALID_PORT_NUMBER (0), then the default port for the specified service is used.

*lpszUsername*
    This points to a null-terminated string that specifies the name of the user to log in. If NULL, an appropriate default is used. For the FTP protocol, the default is anonymous.

*lpszPassword*
    This points to a null-terminated string that specifies the password to use to log in. If both *lpszPassword* and *lpszUsername* are NULL, the default anonymous password is used. In the case of FTP, the default anonymous password is the user's email name. If *lpszPassword* is NULL (or an empty string) but *lpszUsername* is not NULL, a blank password is used. The following table describes the behavior for the four possible settings of *lpszUsername* and *lpszPassword*:

SL:nw 3382-44391 MS 39335 3/27/96                                Appendix A - 4

| lpszUsername | lpszPassword | Username sent to FTP server | Password sent to FTP server |
|---|---|---|---|
| NULL or "" | NULL or "" | "anonymous" | User's email name |
| Non-NULL String | NULL or "" | lpszUsername | "" |
| NULL | Non-NULL String | ERROR | ERROR |
| Non-NULL String | Non-NULL String | lpszUsername | lpszPassword |

*dwService*
>   The type of service to access. This can be INTERNET_SERVICE_FTP, INTERNET_SERVICE_GOPHER, or INTERNET_SERVICE_HTTP.

*dwFlags*
>   This specifies the flags specific to the service used. The possible values for these are:

| dwService | dwFlags supported | |
|---|---|---|
| INTERNET_SERVICE_FTP | INTERNET_CONNECT_FLAG_PASSIVE | Use passive mode in all data connections for this FTP session. |

*dwContext*
>   An application-defined value that is used to identify the application context for the returned handle in callbacks.

Return Value

If the connection is successful, a valid handle to the FTP, Gopher, or HTTP session is returned. If the connection attempt fails, NULL is returned. The application can then call GetLastError to retrieve a specific error code. Applications can also use InternetGetLastResponseInfo to determine why access to the service was denied.

Remarks

The InternetConnect function is required before communicating with any Internet service.

Having a connect function for all protocols, even those which do not use persistent connections, lets an application communicate common information about several requests using a single function call. In addition, this provides room for future versions of Internet protocols which will not require a connection establishment for every request the client performs.

For some protocols, InternetConnect actually establishes a connection with the server while for others, such as Gopher, the actual connection is not established until the application requests a specific transaction.

For maximum efficiency, applications using the Gopher and HTTP protocols should try to minimize calls to InternetConnect and avoid calling for every transaction requested by the user. One way to accomplish this is to keep a small cache of handles returned from InternetConnect, then, when the user makes a request to a previously accessed server, that session handle is still available.

Applications interested in displaying any multiline text information sent by an FTP server can use InternetGetLastResponseInfo to retrieve the text.

SL:nw 3382-44391 MS 39335 3/27/96                                              Appendix A - 5

For FTP connections, if *lpszUsername* is NULL, InternetConnect will send the string "anonymous" as the username. If *lpszPassword* is NULL, InternetConnect will attempt to use the user's email name as the password.

To close the handle returned from InternetConnect, the application should call InternetCloseHandle. This function will disconnect the client from the server and free all resources associated with the connection.

See Also

InternetCloseHandle

InternetOpenUrl

The InternetOpenUrl function begins reading an FTP, Gopher, or HTTP Universal Resource Locator (URL).

HINTERNET InternetOpenUrl(
    HINTERNET *hInternetSession*,
    LPCTSTR *lpszUrl*,
    LPCTSTR *lpszHeaders*,
    DWORD *dwHeadersLength*,
    DWORD *dwFlags*,
    DWORD *dwContext*
);

Parameters

*hInternetSession*
    A handle to the current Internet session returned by InternetOpen.

*lpszUrl*
    The name of the URL to begin reading. Only URLs beginning with ftp:, gopher:, or http: are supported.

*lpszHeaders*
    A pointer to a string containing the headers to be sent to the HTTP server. (See the *lpszHeaders* parameter to HttpSendRequest for more details.)

*dwHeadersLength*
    The length, in characters, of the additional headers. If this is -1L and *lpszHeaders* is non-NULL, then *lpszHeaders* is assumed to be zero-terminated (ASCIIZ) and the length is calculated.

*dwFlags*
    The flags describing how to handle this session. The valid flags are:

| | |
|---|---|
| INTERNET_OPEN_FLAG_NO_CACHE | Do not cache the data, either locally or in any gateways. |
| INTERNET_OPEN_FLAG_RAW_DATA | By default, InternetOpenUrl returns HTML formatted for directories. This overrides the default to return the raw data (WIN32_FIND_DATA structures for FTP and GOPHER_FIND_DATA structures for Gopher). |

SL:nw 3382-44391 MS 39335 3/27/96                    Appendix A - 6

INTERNET_OPEN_FLAG_USE_EXISTING    If possible, reuse the existing connections
                                    to the server for new requests generated by
                                    InternetOpenUrl instead of creating a
                                    new session for each request.

*dwContext*
    An application-defined value that is passed with the returned handle in any callbacks.

Return Value

If the connection is successfully established, a valid handle to the FTP, Gopher, or HTTP URL is returned. If the connection fails, NULL is returned. The application can then call GetLastError to retrieve a specific error code. Applications can also use InternetGetLastResponseInfo to determine why access to the service was denied.

Remarks

The InternetOpenUrl function is a general function and can be used for retrieving data over any of the protocols supported by the Internet functions for Win32.

This is particularly useful when the calling application does not need to access the particulars of a protocol, but only requires the data corresponding to a URL. The InternetOpenUrl function parses the URL string, establishes a connection to the server, and prepares to download the data identified by the URL. The application will then use InternetReadFile to retrieve the URL data. It is not necessary to call InternetConnect prior to InternetOpenUrl.

Use InternetCloseHandle to close the handle returned from InternetOpenUrl. However, note that closing the handle before all the URL data has been read will result in the connection being terminated.

See Also

HttpSendRequest, InternetCloseHandle, InternetOpen, InternetReadFile

InternetReadFile

The InternetReadFile function reads data from a handle opened by the InternetOpenUrl, FtpOpenFile, GopherOpenFile, or HttpOpenRequest functions.

BOOL InternetReadFile(
    HINTERNET *hFile*,
    LPVOID *lpBuffer*,
    DWORD *dwNumberOfBytesToRead*,
    LPDWORD *lpNumberOfBytesRead*
);

Parameters

*hFile*
    A valid handle returned from a previous call to InternetOpenUrl, FtpOpenFile, GopherOpenFile, or HttpOpenRequest.

*lpBuffer*
    Points to the buffer that receives the data read.

SL:nw 3382-44391 MS 39335 3/27/96                           Appendix A - 7

*dwNumberOfBytesToRead*
    Specifies the number of bytes to read.
*lpNumberOfBytesRead*
    Points to the number of bytes read by this call. The InternetReadFile function sets this value to zero before doing any work or error checking.

Return Value

If the function succeeds, the return value is TRUE. If it fails, the return value is FALSE. The GetLastError function can then be used to retrieve extended error information. The InternetGetLastResponseInfo function can also be used, when necessary.

Remarks

If the return value is TRUE and the number of bytes read is zero, then the transfer has been completed and there are no more bytes to be read on the handle. This is analogous to reaching EOF in a local file. The application should then call InternetCloseHandle.

The buffer pointed to by *lpBuffer* is not always filled by calls to InternetReadFile (sufficient data may not have arrived from the server). When reading HTML data, for the first read posted, the buffer must be large enough to hold the HTML headers. When reading HTML-encoded directory entries, the buffer must be large enough to hold at least one complete entry.

See Also

<u>FtpOpenFile</u>, <u>GopherOpenFile</u>, <u>HttpOpenRequest</u>, <u>InternetCloseHandle</u>, <u>InternetOpenUrl</u>

InternetWriteFile

The InternetWriteFile function writes data to an open Internet file.

BOOL InternetWriteFile(
    HINTERNET *hFile*,
    LPVOID *lpBuffer*,
    DWORD *dwNumberOfBytesToWrite*,
    LPDWORD *lpdwNumberOfBytesWritten*
);

Parameters

*hFile*
    A valid handle returned from a previous call to FtpOpenFile.
*lpBuffer*
    Points to the buffer containing the data to be written to the file.
*dwNumberOfBytesToWrite*
    Specifies the number of bytes to write to the file.
*lpdwNumberOfBytesWritten*
    Points to the number of bytes written by this call. The InternetWriteFile function sets this value to zero before doing any work or error checking.

Return Value

SL:nw 3382-44391 MS 39335 3/27/96        Appendix A - 8

If the function succeeds, the return value is TRUE. If the function fails, the return value is FALSE. The GetLastError function can be used to retrieve extended error information. The InternetGetLastResponseInfo function can also be used, when necessary.

Remarks

When the application is sending data, it must call the InternetCloseHandle function to end the data transfer.

See Also

FtpOpenFile, InternetCloseHandle

InternetFindNextFile

The InternetFindNextFile function continues a file search from a previous call to FtpFindFirstFile or GopherFindFirstFile.

BOOL InternetFindNextFile(
   HINTERNET *hFind*,
   LPVOID *lpvFindData*
   );

Parameters

*hFind*
   A valid handle returned from either FtpFindFirstFile or GopherFindFirstFile.

*lpvFindData*
   This points to a buffer that receives information about the found file or directory. The format of the information placed in the buffer depends on the protocol in use. The FTP protocol returns a WIN32_FIND_DATA structure and the Gopher protocol returns a GOPHER_FIND_DATA structure.

Return Value

If the function succeeds, the return value is TRUE. If it fails, the return value is FALSE. The GetLastError function can be used to retrieve extended error information. If no matching files can be found, the GetLastError function returns ERROR_NO_MORE_FILES.

See Also

FtpFindFirstFile, GopherFindFirstFile

InternetQueryOption

The InternetQueryOption function queries an Internet option on the specified handle.

BOOL InternetQueryOption(
   HINTERNET *hInternet*,
   DWORD *dwOption*,
   LPVOID *lpBuffer*,
   LPDWORD *lpdwBufferLength*
   );

SL:nw  3382-44391 MS 39335 3/27/96                    Appendix A - 9

Parameters

*hInternet*
   The Internet handle on which to query information.

*dwOption*
   The Internet option to query. The following options are defined as:

| Value | Meaning |
|---|---|
| INTERNET_OPTION_CALLBACK | Returns the address of the callback function defined for this handle. |
| INTERNET_OPTION_CONNECT_TIMEOUT | The time-out value in milliseconds to use for Internet connection requests. If a connection request takes longer than this time-out, the request is canceled. The default time-out is infinite. |
| INTERNET_OPTION_CONNECT_RETRIES | The retry count to use for Internet connection requests. If a connection attempt still fails after the specified number of tries, the request is canceled. The default is five retries. |
| INTERNET_OPTION_CONNECT_BACKOFF | The delay value in milliseconds to wait between connection retries. |
| INTERNET_OPTION_CONTROL_SEND_TIMEOUT | The time-out value in milliseconds to use for nondata (control) Internet send requests. If a nondata send request takes longer than this time-out, the request is canceled. The default time-out is infinite. Currently, this value only has meaning for FTP sessions. |
| INTERNET_OPTION_CONTROL_RECEIVE_TIMEOUT | The time-out value in milliseconds to use for nondata (control) Internet receive requests. If a nondata receive request takes longer than this time-out, the request is canceled. The default time-out is infinite. Currently, this value only has meaning for FTP sessions. |
| INTERNET_OPTION_DATA_SEND_TIMEOUT | The time-out value in milliseconds to use for data Internet send requests. If a data send request takes longer than this time-out, the request is canceled. The default time-out is infinite. |
| INTERNET_OPTION_DATA_RECEIVE_TIMEOUT | The time-out value in milliseconds to use for data Internet receive requests. If a data receive request takes longer than this time-out, the request is canceled. The default time-out is infinite. |

| | |
|---|---|
| INTERNET_OPTION_HANDLE_TYPE | Returns the type of the Internet handle passed in. Possible return values include:<br><br>INTERNET_HANDLE_TYPE_INTERNET<br>INTERNET_HANDLE_TYPE_CONNECT_FTP<br>INTERNET_HANDLE_TYPE_CONNECT_GOPHER<br>INTERNET_HANDLE_TYPE_CONNECT_HTTP<br>INTERNET_HANDLE_TYPE_FTP_FIND<br>INTERNET_HANDLE_TYPE_FTP_FIND_HTML<br>INTERNET_HANDLE_TYPE_FTP_FILE<br>INTERNET_HANDLE_TYPE_FTP_FILE_HTML<br>INTERNET_HANDLE_TYPE_GOPHER_FIND<br>INTERNET_HANDLE_TYPE_GOPHER_FIND_HTML<br>INTERNET_HANDLE_TYPE_GOPHER_FILE<br>INTERNET_HANDLE_TYPE_GOPHER_FILE_HTML<br>INTERNET_HANDLE_TYPE_HTTP_REQUEST |
| INTERNET_OPTION_CONTEXT_VALUE | Returns the context value associated with this Internet handle. |
| INTERNET_OPTION_CHOOSE_TRANSPORT | Choose the transport/network protocol suite. |
| INTERNET_OPTION_CHOOSE_SECURITY | Choose security options. |

*lpBuffer*
    A buffer which receives the option setting.

*lpdwBufferLength*
    A pointer to a DWORD containing the length of *lpBuffer*. On return, this contains the length of the data placed into *lpBuffer*.

Return Value

If the operation was successful, a value of TRUE is returned. If an error occurred, a value of FALSE is returned. In this case, the application can call GetLastError to retrieve a specific error code.

Remarks

See InternetSetOption to select and set the specific option to query.

InternetSetOption

The InternetSetOption function sets an Internet option on the specified handle.

BOOL InternetSetOption(
  HINTERNET *hInternetSession*,
  DWORD *dwOption*,
  LPVOID *lpBuffer*,
  DWORD *dwBufferLength*
  );

Parameters

SL:nw 3382-44391 MS 39335 3/27/96          Appendix A - 11

*hInternetSession*
    The Internet handle on which to set information.

*dwOption*
    The Internet option to set. See <u>InternetQueryOption</u> for a list of possible options.

*lpBuffer*
    A buffer which contains the option setting.

*dwBufferLength*
    The length of *lpBuffer*.

Return Value

If the operation was successful, a value of TRUE is returned. If an error occurred, a value of FALSE is returned. The application can call GetLastError to retrieve a specific error code.

Remarks

See <u>InternetQueryOption</u> for a list of possible options.

InternetGetLastResponseInfo

The InternetGetLastResponseInfo function retrieves error text from the last Win32 Internet function that failed.

BOOL InternetGetLastResponseInfo(
    LPDWORD *lpdwError,*
    LPTSTR *lpszBuffer,*
    LPDWORD *lpdwBufferLength*
);

Parameters

*lpdwError*
    Receives an error code pertaining to the operation that failed.

*lpszBuffer*
    A buffer which receives the error text.

*lpdwBufferLength*
    On input, this is the size of the buffer pointed to by *lpszBuffer*. On output, this is the size of the string written to the buffer.

Return Value

If error text was successfully written to the buffer, a value of TRUE is returned. If an error occurred, a value of FALSE is returned. In this case, the application can call GetLastError to retrieve a specific error code. If the buffer is too small to hold all the error text, GetLastError returns ERROR_INSUFFICIENT_BUFFER. The *lpdwBufferLength* parameter will contain the minimum buffer size required to return all the error text.

Remarks

The FTP and Gopher protocols can return additional text information along with most errors. This extended error information can be retrieved by using the InternetGetLastResponseInfo function whenever a GetLastError returns ERROR_INTERNET_EXTENDED_ERROR (occurring after an unsuccessful function call).

The buffer pointed to by *lpszBuffer* must be large enough to hold both the error string and a zero terminator at the end of the string. However, note that the value returned in *lpdwBufferLength* does not include the terminating zero.

InternetSetStatusCallback

The InternetSetStatusCallback function sets up a callback function that Win32 Internet functions can call when progress is made during an operation.

INTERNET_STATUS_CALLBACK InternetSetStatusCallback(
  HINTERNET *hInternet*,
    INTERNET_STATUS_CALLBACK *lpfnInternetCallback*
  );

Parameters

*hInternet*
    The handle for which to set the callback

*lpfnInternetCallback*
    A pointer to a callback function to be called when progress is made, or to return NULL to remove the existing callback function.

Return Value

This function returns the previously defined status callback function. It returns NULL if there was no previously defined status callback, or INVALID_INTERNET_STATUS_CALLBACK if the callback is not valid.

Remarks

Many of the Win32 Internet functions perform several operations on the network. Each operation can take time to complete and each can fail.

In some cases, it is desirable to display processing status during a long-term operation. You can enable this by setting up an Internet status callback function. The status callback cannot be removed as long as any callbacks or any asynchronous functions are pending.

After initiating InternetSetStatusCallback, it can be accessed from within any Win32 Internet function for monitoring time-intensive network operations. The function is defined as:

BOOL lpfnInternetCallback (
  HINTERNET *hInternet*,
  DWORD *dwContext*,
  DWORD *dwInternetStatus*,
  LPVOID *lpvStatusInformation*,
  DWORD *dwStatusInformationLength*
  );

SL:nw 3382-44391 MS 39335 3/27/96  Appendix A - 13

The *dwInternetStatus* parameter indicates the operation the Internet DLL is performing. The contents of *lpvStatusInformation* depends on the value of *dwInternetStatus*, and *dwStatusInformationLength* indicates the length of the data included in *lpvStatusInformation*. The following status values for *dwInternetStatus* are defined as:

| Value | Meaning |
|---|---|
| INTERNET_STATUS_RESOLVING_NAME | Looking up the IP address of the name contained in *lpvStatusInformation*. |
| INTERNET_STATUS_NAME_RESOLVED | Successfully found the IP address of the name contained in *lpvStatusInformation*. |
| INTERNET_STATUS_CONNECTING_TO_SERVER | Connecting to the socket address (SOCKADDR) pointed to by *lpvStatusInformation*. |
| INTERNET_STATUS_CONNECTED_TO_SERVER | Successfully connected to the socket address (SOCKADDR) pointed to by *lpvStatusInformation*. |
| INTERNET_STATUS_SENDING_REQUEST | Sending the information request to the server. The *lpvStatusInformation* parameter is NULL. |
| INTERNET_STATUS_REQUEST_SENT | Successfully sent the information request to the server. The *lpvStatusInformation* parameter is NULL. |
| INTERNET_STATUS_RECEIVING_RESPONSE | Waiting for the server to respond to a request. The *lpvStatusInformation* parameter is NULL. |
| INTERNET_STATUS_RESPONSE_RECEIVED | Successfully received a response from the server. The *lpvStatusInformation* parameter is NULL. |
| INTERNET_STATUS_CLOSING_CONNECTION | Closing the connection to the server. The *lpvStatusInformation* parameter is NULL. |
| INTERNET_STATUS_CONNECTION_CLOSED | Successfully closed the connection to the server. The *lpvStatusInformation* parameter is NULL. |
| INTERNET_STATUS_HANDLE_CREATED | Used by InternetConnect to indicate it has created the new handle. This lets the application call InternetCloseHandle from another thread, if the connect is taking too long. |
| INTERNET_STATUS_HANDLE_CLOSING | Lets the application know that the handle is being closed |

SL:nw  3382-44391 MS 39335 3/27/96                    Appendix A - 14

| | |
|---|---|
| INTERNET_STATUS_REQUEST_COMPLETE | An asynchronous operation has been completed. See InternetOpen for details on INTERNET_FLAG_ASYNC.<br><br>The *lpvStatusInformation* parameter will be NULL and *dwStatusInformationLength* will contain the final completion status of the asynchronous function. If this is ERROR_INTERNET_EXTENDED _ERROR, the application can retrieve the server error information by using InternetGetLastResponseInfo. |
| INTERNET_STATUS_REDIRECT | Used to inform the application that a HTTP request has been redirected |

A return value of FALSE from *lpfnInternetCallback* cancels the operation and causes the Win32 Internet function to fail.

See Also

InternetCloseHandle, InternetConnect, InternetGetLastResponseInfo, InternetOpen

FTP Functions

The FTP functions deal with the FTP file and directory manipulation and navigation.

FtpFindFirstFile

The FtpFindFirstFile function begins searching the current directory of the given FTP session. File and directory entries are returned to the application in the WIN32_FIND_DATA structure.

HINTERNET FtpFindFirstFile(
   HINTERNET *hFtpSession*,
   LPCTSTR *lpszSearchFile*,
   LPWIN32_FIND_DATA *lpFindFileData*,
   DWORD *dwFlags*,
   DWORD *dwContext*
);

Parameters

*hFtpSession*
   A valid handle to an FTP session returned from InternetConnect.

*lpszSearchFile*
   This points to a null-terminated string that specifies a valid directory pathname or filename for the FTP server's file system.

*lpFindFileData*
This points to the WIN32_FIND_DATA structure that receives information about the found file or directory.

*dwFlags*
Open and caching flags.

*dwContext*
An application-defined value that associates this search with any application data. This is only used if the application has already set up a status callback with InternetSetStatusCallback.

Return Value

If the directory enumeration was started successfully, a valid handle for the request is returned. If an error occurred, NULL is returned. In this case, an application can call GetLastError to retrieve a specific error code. If no matching files can be found, the GetLastError function returns ERROR_NO_MORE_FILES.

Remarks

This function will enumerate both files and directories.

The FtpFindFirstFile function is similar to the Win32 function FindFirstFile. Note, however, an important difference is that only one FtpFindFirstFile can occur at a time within a given FTP session. The enumerations, therefore, are correlated with the FTP session handle. This is because the FTP protocol allows only a single directory enumeration per session.

After calling FtpFindFirstFile and until calling InternetCloseHandle, the application cannot call FtpFindFirstFile again on a given FTP session handle. If this happens, calls to the FtpFindFirstFile function will fail with error code ERROR_FTP_TRANSFER_IN_PROGRESS.

After beginning a directory enumeration with FtpFindFirstFile, the InternetFindNextFile function can be used to continue the enumeration.

The InternetCloseHandle function is used to close the handle returned from FtpFindFirstFile. If the InternetCloseHandle function closes the handle before InternetFindNextFile fails with ERROR_NO_MORE_FILES, the directory enumeration will be terminated.

Because the FTP protocol provides no standard means of enumerating, some of the common information about files, such as file creation date and file, is not always available or correct. When this happens, FtpFindFirstFile and InternetFindNextFile fill in unavailable information with a "best guess" based on available information. For example, creation and last access dates will often be the same as the file's modification date.

The application cannot call FtpFindFirstFile between calls to FtpOpenFile and InternetCloseHandle.

See Also

FtpOpenFile, InternetCloseHandle, InternetFindNextFile, InternetSetStatusCallback

FtpGetFile

The FtpGetFile function retrieves a file from the FTP server and stores it under the specified filename, creating a new local file in the process.

SL:nw 3382-44391 MS 39335 3/27/96                        Appendix A - 16

```
BOOL FtpGetFile(
    HINTERNET hFtpSession,
    LPCTSTR lpszRemoteFile,
    LPCTSTR lpszNewFile,
    BOOL fFailIfExists,
    DWORD dwFlagsAndAttributes,
    DWORD dwFlags,
    DWORD dwContext
);
```

Parameters

*hFtpSession*
    A valid handle to an FTP session.

*lpszRemoteFile*
    A pointer to a null-terminated string that contains the name of the file to retrieve from the remote system.

*lpszNewFile*
    A pointer to a null-terminated string that contains the name of the file to create on the local system.

*fFailIfExists*
A Boolean flag that indicates whether the function should proceed if a local file of the specified name already exists. If *fFailIfExists* is TRUE and the local file exists, FtpGetFile fails.

*dwFlagsAndAttributes*
    This specifies the file attributes and flags for the new file. This can be any combination of FILE_ATTRIBUTE_* and INTERNET_OPEN_FLAG_* file attributes. See CreateFile for further information on FILE_ATTRIBUTE_* attributes, and see InternetOpenUrl for further information on INTERNET_OPEN_FLAG_* flags.

*dwFlags*
    This specifies the conditions under which the transfer occurs. This can be any of the FTP_TRANSFER_TYPE_* constants. For further information on the FTP_TRANSFER_TYPE_* constants, see FtpOpenFile.

*dwContext*
    An application-defined value that associates this search with any application data. This is only used if the application has already set up a status callback with InternetSetStatusCallback.

Return Value

If the file was retrieved successfully, a value of TRUE is returned, if an error occurred, a value of FALSE is returned. In this case, an application can call GetLastError to retrieve a specific error code.

Remarks

The FtpGetFile function is a high-level routine that handles all the bookkeeping and overhead associated with reading a file from an FTP server and storing it locally. Applications needing to retrieve file data only or that require close control over the file transfer, should use the FtpOpenFile and InternetReadFile functions.

Appendix A - 17

If the *dwTransferType* specifies FILE_TRANSFER_TYPE_ASCII, translation of the file data will convert control and formatting characters to local equivalents. The default transfer is binary mode where the file is downloaded in the same format as it is stored on the server.

Both *lpszRemoteFile* and *lpszNewFile* can be either partially qualified filenames relative to the current directory or fully qualified. A backslash ("\") or forward slash ("/") can be used as the directory separator for either name. The FtpGetFile function translates the directory name separators to the appropriate character before they are used.

FtpPutFile

The FtpPutFile function stores a file on the FTP server.

BOOL FtpPutFile(
   HINTERNET *hFtpSession*,
   LPCTSTR *lpszLocalFile*,
   LPCTSTR *lpszNewRemoteFile*,
   DWORD *dwFlags*,
   DWORD *dwContext*
   );

Parameters

*hFtpSession*
   A valid handle to an FTP session.

*lpszLocalFile*
   A pointer to a null-terminated string that contains the name of the file to send from the local system.

*lpszNewRemoteFile*
   A pointer to a null-terminated string that contains the name of the file to create on the remote system.

*dwFlags*
   This specifies the conditions under which the transfer occurs. This can be any combination of FTP_TRANSFER_* defined constants. For further information on the FTP_TRANSFER_* constants, see FtpOpenFile.

*dwContext*
   An application-defined value that associates this search with any application data. This is used only if the application has already set up a status callback with InternetSetStatusCallback.

Return Value

If the file was stored successfully, a value of TRUE is returned. If an error occurred, a value of FALSE is returned. In this case, an application can call GetLastError to retrieve a specific error code.

Remarks

The FtpPutFile function is a high-level routine that handles all the bookkeeping and overhead associated with reading a file from an FTP server and storing it locally. Applications needing to send file data only or that require close control over the file transfer, should use the FtpOpenFile and InternetWriteFile functions.

If the *dwTransferType* specifies FILE_TRANSFER_TYPE_ASCII, translation of the file data will convert control and formatting characters to local equivalents.

Both *lpszNewRemoteFile* and *lpszLocalFile* can be either partially qualified filenames relative to the current directory or fully qualified. A backslash ("\") or forward slash ("/") can be used as the directory separator for either name. The FtpPutFile function translates the directory name separators to the appropriate character before they are used.

FtpDeleteFile

The FtpDeleteFile function deletes a file stored on the FTP server.

BOOL FtpDeleteFile(
    HINTERNET *hFtpSession*,
    LPCTSTR *lpszFileName*
);

Parameters

*hFtpSession*
    A valid handle to an FTP session.

*lpszFileName*
    A pointer to a null-terminated string that contains the name of the file to delete on the remote system.

Return Value

If the file was deleted successfully, a value of TRUE is returned. If an error occurred, a value of FALSE is returned. In this case, an application can call GetLastError to retrieve a specific error code.

Remarks

The *lpszFile* parameter can be either partially qualified filenames relative to the current directory or fully qualified. A backslash ("\") or forward slash ("/") can be used as the directory separator for either name. The FtpDeleteFile function translates the directory name separators to the appropriate character before they are used.

FtpRenameFile

The FtpRenameFile function renames a file stored on the FTP server.

BOOL FtpRenameFile(
    HINTERNET *hFtpSession*,
    LPCTSTR *lpszExisting*,
    LPCTSTR *lpszNew*
);

Parameters

*hFtpSession*
    A valid handle to an FTP session.

*lpszExisting*
    A pointer to a null-terminated string that contains the name of the file which will have its name changed on the remote FTP server.

*lpszNew*
    A pointer to a null-terminated string that contains the new name for the remote file.

SL:nw 3382-44391 MS 39335 3/27/96                                Appendix A - 19

Return Value

If the file was reneamed successfully, a value of TRUE is returned. If an error occurred, a value of FALSE is returned. In this case, an application can call GetLastError to retrieve a specific error code.

Remarks

The *lpszExisting* and *lpszNew* parameters can be either partially qualified filenames relative to the current directory or fully qualified. A backslash ("\") or forward slash ("/") can be used as the directory separator for either name. The FtpRenameFile function translates the directory name separators to the appropriate character before they are used.

FtpOpenFile

The FtpOpenFile function initiates access to a remote file for writing or reading.

HINTERNET FtpOpenFile(
    HINTERNET *hFtpSession*,
    LPCTSTR *lpszFileName*,
    DWORD *fdwAccess*,
    DWORD *dwFlags*,
    DWORD *dwContext*
);

Parameters

*hFtpSession*
    A valid handle to an FTP session.

*lpszFileName*
    A pointer to a null-terminated string that contains the name of the file to access on the remote system.

*fdwAccess*
    This determines how the file will be accessed. This can be GENERIC_READ or GENERIC_WRITE, but not both.

*dwFlags*
    This specifies the conditions under which subsequent transfers occur. This can be any of the following FTP_TRANSFER_* constants:

| Value | Meaning |
| --- | --- |
| FTP_TRANSFER_TYPE_ASCII | The file will be transferred using FTP's ASCII (Type A) transfer method. Control and formatting information will be converted to local equivalents. |
| FTP_TRANSFER_TYPE_BINARY | The file will be transferred using FTP's Image (Type I) transfer method. The file is transferred exactly as it exists with no changes. This is the default transfer method. |

*dwContext*
    An application-defined value that associates this search with any application data. This is only used if the application has already set up a status callback with InternetSetStatusCallback.

Return Value

If the file was opened successfully, a value of TRUE is returned. If an error occurred, a value of FALSE is returned. In this case, an application can call GetLastError to retrieve a specific error code.

Remarks

The FtpOpenFile function should be used in these situations:

- An application has data it wants to send to an FTP server to be created as a file on the FTP server, but the application does not have a local file containing the data. After InternetOpen opens the file with FtpOpenFile, the application will use InternetWriteFile to send the FTP file data to the server.
- An application wants to retrieve a file from the server into application-controlled memory, instead of writing the file to disk. The application uses InternetReadFile after using InternetOpen to open the file.
- An application wants a fine level of control over a file transfer. For example, the application may want to display a "thermometer" when downloading a file to indicate to the user that the file transfer is or is not proceeding correctly.

After calling the FtpOpenFile function and until calling InternetCloseHandle, the application can only call InternetReadFile or InternetWriteFile, InternetCloseHandle, or the FtpFindFirstFile function. Calls to other FTP functions on the same FTP session will fail and set the error code to FTP_ETRANSFER_IN_PROGRESS.

Only one file can be open in a single FTP session. Therefore, no file handle is returned and the application simply uses the FTP session handle when necessary.

The *lpszFile* parameter can be either partially qualified filenames relative to the current directory or fully qualified. A backslash ("\") or forward slash ("/") can be used as the directory separator for either name. The FtpOpenFile function translates the directory name separators to the appropriate character before using it.

The InternetCloseHandle function is used to close the handle returned from FtpOpenFile. If the InternetCloseHandle function closes the handle before all the data has been transferred, the transfer will be terminated.

FtpCreateDirectory

The FtpCreateDirectory function creates a new directory on the FTP server.

BOOL FtpCreateDirectory(
  HINTERNET *hFtpSession*,
  LPCTSTR *lpszDirectory*
  );

Parameters

*hFtpSession*
   A valid handle to an FTP session.

SL:nw 3382-44391 MS 39335 3/27/96      Appendix A - 21

*lpszDirectory*
A pointer to a null-terminated string that contains the name of the directory to create on the remote system. This can be either a fully qualified pathname or a name relative to the current directory.

Return Value

If the function succeeds, FtpCreateDirectory returns TRUE. If an error occurred, then the function failed. An application can use GetLastError to retrieve a specific error code. If the error code indicates that the FTP server denied the request to create a directory, InternetGetLastResponseInfo can be used to determine why.

Remarks

Applications should use FtpGetCurrentDirectory to determine the remote site's current working directory, instead of assuming that the remote system uses a hierarchical naming scheme for directories.

The *lpszDirectory* parameter can be either partially or fully qualified filenames relative to the current directory. A backslash ("\") or forward slash ("/") can be used as the directory separator for either name. The FtpCreateDirectory function translates the directory name separators to the appropriate character before they are used.

FtpRemoveDirectory

The FtpRemoveDirectory function removes the specified directory on the FTP server.

BOOL FtpRemoveDirectory(
    HINTERNET *hFtpSession*,
    LPCTSTR *lpszDirectory*
);

Parameters

*hFtpSession*
A valid handle to an FTP session.

*lpszDirectory*
A pointer to a null-terminated string that contains the name of the directory to remove on the remote system. This can be either a fully qualified pathname or a name relative to the current directory.

Return Value

If the function succeeds, the returne value is TRUE. If it fails, an error occurred. The application can then use GetLastError to retrieve the specific error code. If the error code indicates that the FTP server denied the request to remove a directory, InternetGetLastResponseInfo can be used to determine why.

Remarks

Applications should use FtpGetCurrentDirectory to determine the remote site's current working directory, instead of assuming that the remote system uses a hierarchical naming scheme for directories.

The *lpszDirectory* parameter can be either partially or fully qualified filenames relative to the current directory. A backslash ("\") or forward slash ("/") can be used as the directory separator for either name.

SL:nw 3382-44391 MS 39335 3/27/96               Appendix A - 22

The FtpRemoveDirectory function translates the directory name separators to the appropriate character before they are used.

FtpSetCurrentDirectory

The FtpSetCurrentDirectory function is used to change to a different working directory on the FTP server.

BOOL FtpSetCurrentDirectory(
    HINTERNET *hFtpSession*,
    LPCTSTR *lpszDirectory*
);

Parameters

*hFtpSession*
    A valid handle to an FTP session.

*lpszDirectory*
    A pointer to a null-terminated string that contains the name of the directory to change to on the remote system. This can be either a fully qualified pathname or a name relative to the current directory.

Return Value

If the function succeeds, the return value is TRUE. If it fails, an error occurred. The application can then use GetLastError to retrieve a specific error code. If the error code indicates that the FTP server denied the request to change to a directory, InternetGetLastResponseInfo can be used to determine why.

Remarks

Applications should use FtpGetCurrentDirectory to determine the remote site's current working directory, instead of assuming that the remote system uses a hierarchical naming scheme for directories.

The *lpszDirectory* parameter can be either partially or fully qualified filenames relative to the current directory. A backslash ("\") or forward slash ("/") can be used as the directory separator for either name. The FtpSetCurrentDirectory function translates the directory name separators to the appropriate character before they are used.

FtpGetCurrentDirectory

The FtpGetCurrentDirectory function retrieves the current directory for the specified FTP session.

BOOL FtpGetCurrentDirectory(
    HINTERNET *hFtpSession*,
    LPCTSTR *lpszCurrentDirectory*,
    LPDWORD *lpdwCurrentDirectory*
);

Parameters

*hFtpSession*
    A valid handle to an FTP session.

SL:nw 3382-44391 MS 39335 3/27/96               Appendix A - 23

*lpszCurrentDirectory*
    This points to the buffer for the current directory string. This null-terminated string specifies the absolute path to the current directory.

*lpdwCurrentDirectory*
    This points to a DWORD containing the length, in characters, of the buffer for the current directory string. The buffer length must include room for a terminating null character. Using a length of MAX_PATH will be sufficient for all pathnames. On return, the DWORD contains the number of characters transferred.

Return Value

If the function succeeds, the return value is TRUE. If it fails, an error occurred. The application can then use GetLastError to retrieve the specific error code. If the error code indicates that the FTP server denied the request to change to a directory, InternetGetLastResponseInfo can be used to determine why.

Remarks

If the *lpszCurrentDirectory* buffer is not large enough, then on return *lpdwCurrentDirectory* contains the number of bytes required to retrieve the full, current directory name.

FtpCommand

The FtpCommand function issues an arbitrary command on the FTP server referred to by the session handle.

BOOL FtpCommand(
    HINTERNET *hFtpSession*,
    BOOL *fExpectResponse*,
    DWORD *dwFlags*,
    LPCTSTR *lpszCommand*,
    DWORD *dwContext*
    );

Parameters

*hFtpSession*
    A valid handle to an FTP session.

*fExpectResponse*
    A Boolean value indicating whether the command is expected to cause the FTP server to open a data connection for a reply. If TRUE, FtpCommand creates a connection endpoint and negotiates for a connection with the FTP server. The application must use InternetReadFile and InternetCloseHandle to read from and close this data connection.

*dwFlags*
    One of the FTP_TRANSFER_TYPE_* constants. If *fExpectResponse* is TRUE, this value governs the type of connection constructed with the FTP server.

*lpszCommand*
    A pointer to a null-terminated format string containing the command to send to the FTP server.

*dwContext*
   An application-defined value that associates this search with any application data. This is only used if the application has already set up a status callback with InternetSetStatusCallback.

Return Value

If the function succeeds, the return value is TRUE. If it fails, an error occurred. The application can then use GetLastError to retrieve a specific error code. If the error code indicates that the FTP server denied the request to change to a directory, InternetGetLastResponseInfo can be used to determine why.

Remarks

The application must use InternetGetLastResponseInfo to determine the FTP server's response to the command.

The FtpCommand function ensures that the text sent contains only ASCII-printable characters and filters the string appropriately, adding the necessary end-of-line characters.

If *fExpectResponse* is TRUE, FtpCommand will issue the appropriate PORT or PASV command from the FTP protocol.

Gopher Functions

The Gopher functions control the creation and use of the Internet Gopher utilities.

GopherCreateLocator

The GopherCreateLocator function creates a Gopher or Gopher+ locator string from its component parts.

BOOL GopherCreateLocator(
   LPCTSTR *lpszHost*,
   INTERNET_PORT *nServerPort*,
   LPCTSTR *lpszDisplayString*,
   LPCTSTR *lpszSelectorString*,
   DWORD *dwGopherType*,
   LPCTSTR *lpszLocator*,
   LPDWORD *lpdwBufferLength*
   );

Parameters

*lpszHost*
   A string identifying the name of the host, or a dotted-decimal IP address (such as 198.105.232.1).

*nServerPort*
   A port on which the Gopher server at *Host* lives, in host byte order. If *nPort* is INVALID_PORT_NUMBER, then the default Gopher port is read from the \etc\services file.

*lpszDisplayString*
   The Gopher document or directory to be displayed. The *lpszDisplayString* parameter can be NULL. In this case, the default directory for the Gopher server will be returned.

SL:nw 3382-44391 MS 39335 3/27/96                Appendix A - 25

*lpszSelectorString*
    The selector string to be sent to the Gopher server in order to retrieve information. This can be NULL.

*dwGopherType*
    This specifies whether *lpszSelector* refers to a directory or document, and whether the request is Gopher+ or Gopher. See GOPHER_FIND_DATA Attributes.

*lpszLocator*
    A pointer to the buffer where the locator string will be returned. If *lpszLocator* is NULL, *lpdwBufferLength* receives the needed buffer length but no other processing occurs.

*lpdwBufferLength*
    On input, the length of *lpszLocator*. On output, the number of bytes written to *lpszLocator* or, if the *lpszLocator* buffer is too small, the number of bytes required to form the locator successfully.

Return Value

A value of TRUE is returned if the function was successful. If it was not, a value of FALSE is returned. In this case, more information can be obtained using GetLastError and InternetGetLastResponseInfo.

Remarks

In order to retrieve information from a Gopher server, an application must first get a Gopher "locator" from the Gopher server.

The locator, which the application should treat as an opaque token, is normally used for calls to the GopherFindFirstFile function to retrieve a specific piece of information.

GopherGetLocatorType

The GopherGetLocatorType function parses a Gopher locator and determines its attributes.

BOOL GopherGetLocatorType(
    LPCTSTR *lpszLocator*,
    LPDWORD *lpdwGopherType*
    );

Parameters

*lpszLocator*
    A Gopher locator string to parse.

*lpdwGopherType*
    This receives the type of the locator and is is a bitmask of any of the following:

| Value | Meaning |
| --- | --- |
| GOPHER_TYPE_TEXT_FILE | An ASCII text file. |
| GOPHER_TYPE_DIRECTORY | A directory of additional Gopher items. |
| GOPHER_TYPE_CSO | A CSO phone book server. |
| GOPHER_TYPE_ERROR | Indicates an error condition. |
| GOPHER_TYPE_MAC_BINHEX | A Macintosh file in BINHEX format. |

| | |
|---|---|
| GOPHER_TYPE_DOS_ARCHIVE | A DOS archive file. |
| GOPHER_TYPE_UNIX_UUENCODED | A UUENCODED file. |
| GOPHER_TYPE_INDEX_SERVER | Refers to an index server. |
| GOPHER_TYPE_TELNET | A Telnet Server. |
| GOPHER_TYPE_BINARY | A binary file. |
| GOPHER_TYPE_REDUNDANT | Refers to a duplicated server. The information contained within is a duplicate of the primary server. |
| | The primary server is defined as the last directory entry that did not have a GOPHER_TYPE_REDUNDANT type. |
| GOPHER_TYPE_TN3270 | A TN3270 server. |
| GOPHER_TYPE_GIF | A GIF graphics file. |
| GOPHER_TYPE_IMAGE | An image file. |
| GOPHER_TYPE_BITMAP | A bitmap file. |
| GOPHER_TYPE_MOVIE | A movie file. |
| GOPHER_TYPE_SOUND | A sound file. |
| GOPHER_TYPE_HTML | An HTML document. |
| GOPHER_TYPE_PDF | A PDF file. |
| GOPHER_TYPE_CALENDAR | A calendar file. |
| GOPHER_TYPE_INLINE | An inline file |
| GOPHER_TYPE_UNKNOWN | The item type is unknown. |
| GOPHER_TYPE_ASK | An Ask+ item. |
| GOPHER_TYPE_GOPHER_PLUS | A Gopher+ item. |

Remarks

The GopherGetLocatorType function returns information about the item referenced by a Gopher locator. Note that it is possible for multiple attributes to be set on a file. For example, both GOPHER_TYPE_TEXT_FILE and GOPHER_TYPE_GOPHER_PLUS are set for a text file stored on a Gopher+ server.

GopherFindFirstFile

The GopherFindFirstFile function, when given a Gopher locator and some search criteria, creates a session with the server and locates the requested documents, binary files, index servers, or directory trees.

HINTERNET GopherFindFirstFile(
    HINTERNET *hGopherSession*,
    LPCTSTR *lpszLocator*,
    LPCTSTR *lpszSearchString*,
    LPGOPHER_FIND_DATA *lpFindData*,
    DWORD *dwFlags*,
    DWORD *dwContext*

);

Parameters

*hGopherSession*
  A handle to a Gopher session returned by InternetConnect.

*lpszLocator*
  The name of the item to locate. This parameter can be any of the following:
  - A Gopher locator returned in the *lpGopherFindData*, or a *locator* field from a previous call to this function or the InternetFindNextFile function.
  - A NULL pointer or zero-length string indicating that the top-most information from a Gopher server is being returned.
  - A locator created by the GopherCreateLocator function.

*lpszSearchString*
  If this request is to an index server, *lpszSearchString* specifies the strings to search. If the request is not to an index server, *lpszSearchString* should be NULL.

*lpFindData*
  A pointer to application-supplied buffer which will be filled with a GOPHER_FIND_DATA structure.

*dwFlags*
  Open & caching flags

*dwContext*
  An application-defined value that assoicates this search with any application data.

Return Value

If this function is successful, a valid search handle is returned. If it is not, a NULL value is returned. The GetLastError and InternetGetLastResponseInfo functions can be used to obtain more information.

Remarks

The GopherFindFirstFile function closely resembles the Win32 function FindFirstFile. It creates a connection with a Gopher server and then returns a single structure containing information about the first Gopher object referenced by the locator string.

After calling GopherFindFirstFile to retrieve the first Gopher object in an enumeration, the InternetFindNextFile function can be used to retrieve subsequent Gopher objects.

The InternetCloseHandle function is used to close the handle returned from GopherFindFirstFile. If there are any pending operations described by the handle when the application calls InternetCloseHandle, they are canceled or marked closed pending. Any open sessions will be terminated and any data waiting for the caller will be discarded. In addition, any allocated buffers will be freed.

See Also

InternetFindNextFile

SL:nw 3382-44391 MS 39335 3/27/96                  Appendix A - 28

GopherOpenFile

The GopherOpenFile function begins reading a Gopher data file from a Gopher server.

HINTERNET GopherOpenFirst(
    HINTERNET *hGopherSession*,
    LPCTSTR *lpszLocator*,
    LPCTSTR *lpszView*,
    DWORD *dwFlags*,
    DWORD *dwContext*
    );

Parameters

*hGopherSession*
    A handle to a Gopher session returned by InternetConnect.

*lpszLocator*
    A string identifying the file to open. Generally, this locator is returned from a call to
    GopherFindFirstFile or InternetFindNextFile. Because the Gopher protocol has no concept of a
    current directory, the locator is always fully qualified.

*lpszView*
    If several views of the file exist at the server, this parameter describes which file view to open. If
    *lpszView* is NULL, the default file view is used.

*dwFlags*
    Any combination of the INTERNET_OPEN_FLAG_* flags. See InternetOpenUrl for further
    information on INTERNET_OPEN_FLAG_* flags.

*dwContext*
    An application-defined value that associates this operation with any application data.

Return Value

If the file cannot be opened, a NULL value is returned. The GetLastError or
InternetGetLastResponseInfo functions can be used to determine the cause of the error.

Remarks

The GopherOpenFile function opens a file at a Gopher server. Because a file cannot be actually opened
or locked at a server, this call simply associates location information with a handle that can be used for
file-based operations such as InternetReadFile or GopherGetAttribute.

The InternetCloseHandle function is used to close the handle returned from GopherOpenFile. If there
are any pending operations described by the handle when the application calls InternetCloseHandle,
they are canceled or marked closed pending. Any open sessions will be terminated, and any data waiting
for the caller will be discarded. In addition, any allocated buffers will be freed.

See Also

GopherGetAttribute, InternetReadFile

Appendix A - 29

GopherGetAttribute

The GopherGetAttribute function allows an application to retrieve specific attribute information from the server.

BOOL GopherGetAttribute(
    HINTERNET *hGopherSession*,
    LPCTSTR *lpszLocator*,
    LPCTSTR *lpszAttributeName*,
    LPBYTE *lpBuffer*,
    DWORD *dwBufferLength*,
    LPDWORD *lpdwCharactersReturned*,
    GOPHER_ATTRIBUTE_ENUMERATOR *lpfnEnumerator*,
    DWORD *dwContext*
);

Parameters

*hGopherSession*
    A handle to an Gopher session returned by InternetConnect.

*lpszLocator*
    A string identifying the item at Gopher server on which to return attribute information.

*lpszAttributeName*
    A pointer to a space-delimited string specifying the names of attributes to return.

*lpBuffer*
    A pointer to a user-supplied buffer from which attribute information is retrieved.

*dwBufferLength*
    The size of *lpBuffer* in bytes.

*lpdwCharactersReturned*
    The number of characters read into *lpBuffer*.

*lpfnEnumerator*
    This points to a callback enumeration function which is called for each attribute of the locator. This parameter is optional. If it is NULL, all the Gopher attribute information is placed into *lpBuffer*. If *lpfnEnumerator* is specified, then the callback function is called once for each attribute of the object.

The callback function is passed a pointer to a single GOPHER_ATTRIBUTE_TYPE structure for each call. The enumeration callback allows the application to avoid having to parse the Gopher attribute information.

*dwContext*
    An application-defined value that associates this operation with any application data.

Return Value

If the request is satisfied, a value of TRUE is returned. If not, a value of FALSE is returned. The GetLastError or InternetGetLastResponseInfo functions can be used to retrieve more information about the error.

Remarks

SL:nw 3382-44391 MS 39335 3/27/96         Appendix A - 30

Generally, applications will make this call following a GopherFindFirstFile or InternetFindNextFile call which will then request cached information.

The size of the *lpBuffer* parameter must be equal to or greater than the MIN_GOPHER_ATTRIBUTE_LENGTH (defined in WININET.H, currently as 256 bytes).

The GOPHER_ATTRIBUTE_ENUMERATOR function has the following syntax:

BOOL GopherAttributeEnumerator(
    LPGOPHER_ATTRIBUTE_TYPE *lpAttributeInformation*,
    DWORD *dwError*
    );

The *lpAttributeInformation* parameter points to a buffer which contains a single GOPHER_ATTRIBUTE_TYPE structure.

‹The *lpBuffer* parameter to GopherGetAttributes is used for storing this structure.›The *lpBuffer* size must be equal to or greater than the MIN_GOPHER_ATTRIBUTE_LENGTH (currently defined in the WININET.H as 256 bytes.)

The *dwError* parameter is NO_ERROR if the attribute was parsed and written to the buffer successfully. If a problem was encountered, an error code is returned. Returning FALSE from this function immediately stops the enumeration.

HTTP Authentication Callback Functions

HTTP functions that are called by WinINet to provide authentication for custom security protocols.

AuthenticateUser

The AuthenticateUser function verifies a request is valid for the specified authentication scheme. Initializing any internal state if needed.

DWORD AuthenticateUser(    LPVOID   *lppvContext*,

LPSTR  *lpszServerName*,
    LPSTR  *lpszScheme*
    DWORD  *dwFlags*
    LPSTR  *lpszInBuffer*,
    DWORD  *dwInBufferLength*

LPSTR  *lpszUserName*,
    LPSTR  *lpszPassword*
    );

Parameters

*\*lppvContext*
    A pointer to a pointer which contains the context of the current authentcation state. When first called for a specific URL group *lppvContext contains NULL. This allows a plugin DLL to maintain state between calls.

SL:nw 3382-44391 MS 39335 3/27/96          Appendix A - 31

*lpszServerName*
    The name of the WWW server we are attempting to authenticate against.

*lpszScheme*
    The name of the security scheme we are attemping the authenticate with. Some DLLs may support more than one scheme, and this string identifies which scheme is being used.

*lpszInBuffer*
    Contains the Raw Header response from this server. Should contain a 401 or 407 status code within the header indicating an Authentication challenge.

*dwInBufferLength*
    Contains the length in bytes of lpszInBuffer.

*lpszUserName*
    Contains a NULL terminated string which is the username to use in authenticating the user.

*lpszPassword*
    Contains a NULL terminated string which is the password to use in authenticating the user.

Return Value

A successful authentication returns ERROR_SUCCESS, or on failure one of the error codes defined in winerror.h

Remarks

This function is called only when an authentication challange is received from the HTTP server. Headers are not to be formed here, and this function only needs to verify that it is indeed a valid instance of a specific security protocol. And perhaps it may store a state needed for the security protocol.

When a preAuthenticateUser is called the lppvContext will be passed to it, and it is there that headers will be generated to anwser the server challange.

See Also preAuthenticateUser, unloadAuthenticateUser unloadAuthenticateUser

The unloadAuthenticateUser function frees, and clears any state or security scheme specific data that may be store in *lppvContext.

VOID unloadAuthenticateUser(    LPVOID *lppvContext,

LPSTR *lpszServer*,
    LPSTR *lpszScheme*,
    );

Parameters

\**lppvContext*
    A pointer to a pointer which contains the context of the current authentcation state. This allows a plugin DLL to maintain state between calls, and it should be freed on this call.

*lpszServerName*
    The name of the WWW server we are attempted to authenticate against.

*lpszScheme*
   The name of the security scheme we used to authenticate with.

Return Value none.

Remarks none.

See Also

AuthenticateUser, unloadAuthenticateUser preAuthenticateUser

The preAuthenticateUser function preprocesses a request to a server, adding any HTTP security headers that may be nessary to prevent a challange from the server.

**DWORD preAuthenticateUser(   LPVOID   *lppvContext,**

LPSTR lpszServerName,
   LPSTR *lpszScheme*,
   DWORD *dwFlags*,
   LPSTR *lpszInBuffer*,
   DWORD *dwInBufferLength*,
   LPSTR *lpszOutBuffer*,
   LPDWORD *lpdwOutBufferLength*,
   LPSTR *lpszUserName*,
   LPSTR *lpszUserName*,
   LPSTR *lpszPassword*,
   );
Parameters

*lppvContext
   A pointer to a pointer which contains the context of the current authentcation state. This allows a plugin DLL to maintain state between calls.

lpszServerName
   The name of the WWW server we are attempting to authenticate against.

lpszScheme
   The name of the security scheme we are attemping the authenticate with. Some DLLs may support more than one scheme, and this string identifies which scheme is being used.

lpszInBuffer
   Contains the most recently received Raw Header response from this server. If there has not been a conversation with the server, this will be a NULL terminated string.

dwInBufferLength
   Contains the length in bytes of lpszInBuffer.

SL:nw 3382-44391 MS 39335 3/27/96                    Appendix A - 33 lpszOutBuffer
    On success, contains the fully formed and generated output of security header.
dwOutBufferLength
    Contains a pointer to the length in bytes of lpszOutBuffer.
lpszUserName
    Contains a NULL terminated string which is the username to use in authenticating the user.
lpszPassword
    Contains a NULL terminated string which is the password to use in authenticating the user.

Return Value

A successful authentication returns ERROR_SUCCESS, or on failure one of the error codes defined in winerror.h

Remarks

This function is called only when WinINet has a cached entry for this security scheme. A cached entry means that a challenge has been received from an HTTP server for this security scheme.

preAuthenticateUser should generate the complete header in lpszOutBuffer, EXCEPT the "Authorization: " or the "Proxy-Authorization: " part of the header. This part will be generated and concatenated with a space.

See Also

AuthenticateUser, unloadAuthenticateUser

HTTP Functions

The HTTP functions control the transmission and content of HTTP requests.

HttpOpenRequest

The HttpOpenRequest function opens an HTTP request handle.

HINTERNET HttpOpenRequest(
    HINTERNET *hHttpSession,*
    LPCTSTR *lpszVerb,*
    LPCTSTR *lpszObjectName,*
    LPCTSTR *lpszVersion,*
    LPCTSTR *lpszReferer,*
    LPCTSTR FAR \* *lpszAcceptTypes,*
    DWORD *dwFlags,*
    DWORD *dwContext*
    );

Parameters

*hHttpSession*
    A handle to an HTTP session returned by InternetConnect.

SL:nw  3382-44391 MS 39335  3/27/96                Appendix A - 34

*lpszVerb*
    The verb to use in the request. If NULL, defaults to "GET".

*lpszObjectName*
    The target object of the specified verb. This is generally a filename, an executable module, or a search specifier. If NULL, defaults to "/".

*lpszVersion*
    The HTTP version for the request. The high word defines the minor version and the low word defines the major version. This must be HTTP_VERSION in version 1.0 of the Internet functions for Win32. If NULL, defaults to "HTTP/1.0"

*lpszReferer*
    This specifies the address (URL) of the document from which the URL in the request (*lpszObjectName*) was obtained. This can be NULL. In this case, no "referer" is specified.

*lpszAcceptTypes*
    This points to a null-terminated array of LPCTSTR pointers indicating content types accepted by the client. This value can be NULL. In this case, no accept types are accepted by the client. Servers interpret a lack of accept types to indicate that the client only accepts documents of type "text/*" (that is, only text documents and not pictures or other binary files).

*dwFlags*
    Any combination of the INTERNET_OPEN_FLAG_* flags. See InternetOpenUrl for further information on INTERNET_OPEN_FLAG_* flags.

*dwContext*
    An application-defined value that associates this operation with any application data.

Return Value

If the function was successful, a valid (non-NULL) HTTP request handle is returned. If not, a NULL value is returned. Extended error information can be retrieved by calling the GetLastError function.

Remarks

This function creates a new HTTP request handle and stores the specified parameters in that handle. An HTTP request handle holds a request to be sent to an HTTP server and contains all RFC822/MIME/HTTP headers to be sent as part of the request.

The InternetCloseHandle function is used to close the handle returned by HttpOpenRequest. The InternetCloseHandle cancels all outstanding I/O on the handle.

The *lpszCallerApplicationName* parameter to InternetOpen is used as the referrer for the HTTP request.

See Also

HttpAddRequestHeaders, HttpQueryInfo, HttpSendRequest, InternetCloseHandle, InternetOpen, InternetReadFile

HttpAddRequestHeaders

The HttpAddRequestHeaders function adds one or more HTTP request headers to the HTTP request handle.

SL:nw 3382-44391 MS 39335 3/27/96        Appendix A - 35

```
BOOL HttpAddRequestHeaders(
    HINTERNET hHttpRequest,
    LPCTSTR lpszHeaders,
    DWORD dwHeadersLength,
    DWORD dwModifiers
    );
```

Parameters

*hHttpRequest*
   An open HTTP request handle returned by HttpOpenRequest.

*lpszHeaders*
   The headers to append to the request. Each header must be terminated by a CR/LF pair.

*dwHeadersLength*
   The length, in characters, of *lpszHeaders*. If this is -1L, then *lpszHeaders* is assumed to be zero terminated (ASCIIZ) and the length is computed.

*dwModifiers*
   This is used to modify the semantics. This can be one or more of the following:

| Modifier | Meaning |
|---|---|
| HTTP_ADDREQ_FLAG_REPLACE | Replaces the header. If the header-value is missing, the specified header is removed |
| HTTP_ADDREQ_FLAG_COALESCE | Coalesces headers of the same name. For example, adding "Accept: text/*" followed by "Accept: audio/*" with this flag results in the formation of the single header "Accept: text/*, audio/*". This will cause the first header found to be coalesced. ‹However, see below—we may want to specify an index.› It is up to the calling application to ensure a cohesive scheme with respect to coalesced/separate headers. |
| HTTP_ADDREQ_FLAG_ADD | If specified with HTTP_ADDREQ_FLAG_REPLACE, the header will be added if it was not found |
| HTTP_ADDREQ_FLAG_ADD_IF_NEW | The header will only be added if it doesn't already exist |

Remarks

This function appends additional, free-format headers to the HTTP request handle and is intended for use by sophisticated clients who need detailed control over the exact request sent to the HTTP server.

Return Value

If the function is successful, a value of TRUE is returned. If not, a value of FALSE is returned. Extended error information can be retrieved by calling the GetLastError function.

Note that for basic HttpAddRequestHeaders, the application can pass in multiple headers in a single buffer. If the application is trying to remove or replace a header, then only one header can be supplied in *lpszHeaders*.

See Also

SL:nw 3382-44391 MS 39335 3/27/96     Appendix A - 36

HttpOpenRequest, HttpSendRequest

HttpSendRequest

The HttpSendRequest function sends the specified request to the HTTP server.

BOOL HttpSendRequest(
    HINTERNET *hHttpRequest*,
    LPCTSTR *lpszHeaders*,
    DWORD *dwHeadersLength*,
    LPVOID *lpOptional*,
    DWORD *dwOptionalLength*
    );

Parameters

*hHttpRequest*
    An open HTTP request handle returned by HttpOpenRequest.

*lpszHeaders*
    Additional headers to be appended to the request. This can be NULL, if there are no additional headers to append.

*dwHeadersLength*
    The length, in characters, of the additional headers. If this is -1L and *lpszHeaders* is non-NULL, then *lpszHeaders* is assumed to be zero terminated (ASCIIZ) and the length is calculated.

*lpOptional*
    Any optional data to send immediately after the request headers. This is generally used for POST and PUT operations. This can be NULL if there is no optional data to send.

*dwOptionalLength*
    The length, in bytes, of the optional data. This can be zero if there is no optional data to send.

Remarks

This function sends the specified request to the HTTP server and allows the client to specify additional RFC822/MIME/HTTP headers to send along with the request.

The function also lets the client specify optional data to send to the HTTP server immediately following the request headers. This feature is generally used for "write" operations such as PUT and POST.

After the request is sent, the status code and response headers from the HTTP server are read. These headers are maintained internally and are available to client applications through the HttpQueryInfo function.

Return Value

If the function is successful, a value of TRUE is returned. If not, a value of FALSE is returned. Extended error information can be retrieved by calling the GetLastError function.

See Also

HttpOpenRequest, HttpQueryInfo, InternetReadFile

SL:nw 3382-44391 MS 39335 3/27/96                                Appendix A - 37

HttpQueryInfo

The HttpQueryInfo function queries information about an HTTP request.

BOOL HttpQueryInfo(
    HINTERNET *hHttpRequest*,
    DWORD *dwInfoLevel*,
    LPVOID *lpvBuffer* (OPTIONAL),
    LPWORD *lpvBufferLength*,
    LPWORD *lpdwIndex* (OPTIONAL),
    );

Parameters

*hHttpRequest*
    An open HTTP request handle returned by HttpOpenRequest.

*dwInfoLevel*
    This indicates the attribute to query. Each of these query types will return a string of the indicated type, if it exists, from the returned content headers of an HTTP request. The request is identified by a handle. For example, if you queried HTTP_QUERY_CONTENT_TYPE and the content type existed in the received headers, you would receive "text/html."

*lpvBuffer*
    [In/Out] A pointer to the buffer that will receive the information.

*lpdwBufferLength*
    [In/Out] On entry, this points to a value containing the length, in bytes, of the data buffer. On exit, this points to a value containing the length, in bytes, of the information written to the buffer.

*lpdwIndex*
    [In/Out] If supplied, a pointer to a zero-based header index. This can be used to enumerate multiple headers with the same name. On input,this indicates the index of the specified header to return. On output, this indicates the index of the next header. If the next index cannot be found, ERROR_HTTP_HEADER_NOT_FOUND will be returned.

The possible values include:

HTTP_QUERY_MIME_VERSION
    HTTP_QUERY_CONTENT_TYPE
    HTTP_QUERY_CONTENT_TRANSFER_ENCODING
    HTTP_QUERY_CONTENT_ID
    HTTP_QUERY_CONTENT_DESCRIPTION
    HTTP_QUERY_CONTENT_LENGTH
    HTTP_QUERY_ALLOWED_METHODS
    HTTP_QUERY_PUBLIC_METHODS
    HTTP_QUERY_DATE
    HTTP_QUERY_EXPIRES
    HTTP_QUERY_LAST_MODIFIED
    HTTP_QUERY_MESSAGE_ID
    HTTP_QUERY_URI

SL:nw 3382-44391 MS 39335 3/27/96     Appendix A - 38

HTTP_QUERY_DERIVED_FROM
HTTP_QUERY_LANGUAGE
HTTP_QUERY_COST
HTTP_QUERY_WWW_LINK
HTTP_QUERY_PRAGMA
HTTP_QUERY_VERSION
HTTP_QUERY_STATUS_CODE
HTTP_QUERY_STATUS_TEXT
HTTP_QUERY_RAW_HEADERS
HTTP_QUERY_RAW_HEADERS_CRLF

Remarks

Most information levels return simple values. For example, HTTP_QUERY_CONTENT_LENGTH returns an ASCII string representing the size, in bytes, of the returned object.

The HTTP_QUERY_RAW_HEADERS is not so simple. This information level lets a client access the raw RFC822/MIME/HTTP headers returned by the HTTP server. On entry to this function, *lpBuffer* points to the field name of the header to retrieve (for example, Accept). If *lpBuffer* points to an empty string (for example, ""), then *all* headers are returned.

HttpQueryInfo() returns in *lpdwBufferLength* the number of characters returned in lpBuffer including 1 for the terminating NUL character. This value should be reduced by 1 if TRUE is returned. It will be fixed to return the proper string length (excluding the null character) in later releases of wininet.

Return Value

If the function is successful, a value of TRUE is returned. If it is not, a value of FALSE is returned. Extended error information can be retrieved by calling the GetLastError function.

See Also

<u>HttpOpenRequest</u>

Structure Definitions

This list identifies Gopher data structures and their uses.

GOPHER_FIND_DATA

```
typedef struct {
    TCHAR DisplayString[MAX_GOPHER_DISPLAY_TEXT + 1];
    DWORD GopherType;
    DWORD SizeLow;
    DWORD SizeHigh;
    FILETIME LastModificationTime;
    TCHAR Locator[MAX_GOPHER_LOCATOR_LENGTH + 1];
} GOPHER_FIND_DATA, FAR *LPGOPHER_FIND_DATA;
```

Appendix A - 39

The GopherFindFirstFile and InternetFindNextFile functions return GOPHER_FIND_DATA structures. The fields of GOPHER_FIND_DATA have the following meanings:

Members

DisplayString
  A friendly name that identifies the object. Display this string to the user for selection.

GopherType
  A mask of flags that describe the item returned.

FileSizeLow
  The low 32 bits of the file size.

FileSizeHigh
  The high 32 bits of the file size.

LastModificationTime
  The time the file was last modified.

Locator
  A locator that identifies the file. Pass this locator to GopherOpenFile or GopherFindFirstFile.

See Also

<u>GopherFindFirstFile</u>

GOPHER_ATTRIBUTE_TYPE

```
typedef struct {
    DWORD CategoryId
    DWORD AttributeId
    union {
        GOPHER_ADMIN_ATTRIBUTE Admin;
        GOPHER_MOD_DATE_ATTRIBUTE ModDate;
        GOPHER_SCORE_ATTRIBUTE Score;
        GOPHER_SCORE_RANGE_ATTRIBUTE ScoreRange;
        GOPHER_SITE_ATTRIBUTE Site;
        GOPHER_ORGANIZATION_ATTRIBUTE Organization;
        GOPHER_LOCATION_ATTRIBUTE Location;
        GOPHER_GEOGRAPHICAL_LOCATION_ATTRIBUTE GeographicalLocation;
        GOPHER_TIMEZONE_ATTRIBUTE TimeZone;
        GOPHER_PROVIDER_ATTRIBUTE Provider;
        GOPHER_VERSION_ATTRIBUTE Version;
        GOPHER_ABSTRACT_ATTRIBUTE Abstract;
        GOPHER_VIEW_ATTRIBUTE View;
        GOPHER_VERONICA_ATTRIBUTE Veronica;
        GOPHER_ASK_ATTRIBUTE_TYPE Ask;
        GOPHER_UNKNOWN_ATTRIBUTE Unknown;
    } AttributeType;
} GOPHER_ATTRIBUTE_TYPE, *LPGOPHER_ATTRIBUTE_TYPE;
```

The GOPHER_ATTRIBUTE_TYPE structure contains the relevant information of a single Gopher attribute for an object.

Members

CategoryId
    The Gopher name for the attribute. The possible values include:
    GOPHER_CATEGORY_ID_ALL
    GOPHER_CATEGORY_ID_INFO
    GOPHER_CATEGORY_ID_ADMIN
    GOPHER_CATEGORY_ID_VIEWS
    GOPHER_CATEGORY_ID_ABSTRACT
    GOPHER_CATEGORY_ID_VERONICA
    GOPHER_CATEGORY_ID_UNKNOWN

AttributeId
    Defines the structure that is contained in the AttributeType member of
    GOPHER_ATTRIBUTE_TYPE. The possible values include:
    GOPHER_ATTRIBUTE_ID_ADMIN
    GOPHER_ATTRIBUTE_ID_MOD_DATE
    GOPHER_ATTRIBUTE_ID_TTL
    GOPHER_ATTRIBUTE_ID_SCORE
    GOPHER_ATTRIBUTE_ID_RANGE
    GOPHER_ATTRIBUTE_ID_SITE
    GOPHER_ATTRIBUTE_ID_ORG
    GOPHER_ATTRIBUTE_ID_LOCATION
    GOPHER_ATTRIBUTE_ID_GEOG
    GOPHER_ATTRIBUTE_ID_TIMEZONE
    GOPHER_ATTRIBUTE_ID_PROVIDER
    GOPHER_ATTRIBUTE_ID_VERSION
    GOPHER_ATTRIBUTE_ID_ABSTRACT
    GOPHER_ATTRIBUTE_ID_VIEW
    GOPHER_ATTRIBUTE_ID_TREEWALK
    GOPHER_ATTRIBUTE_ID_UNKNOWN

AttributeType
    The actual setting for the Gopher attribute. The specific value of AttributeType depends on the
    dwAttribute member. The definitions of the various attribute structures is available in WININET.H.

See Also

GopherGetAttribute

We claim:

1. A computer readable medium having stored therein a library of protocol-independent reentrant network interface functions providing a common calling interface for networking application protocols including at least one application protocol selected from the group consisting of HTTP, FTP, SMTP, and Gopher, such functions callable simultaneously by client applications on a client computer, and such functions using one or more network connections based upon a network communication protocol from the group of network communication protocols consisting of TCP/IP, UDP/IP, NetBIOS, NetBUEI, IPX/SPX, DECnet, and OSI/TP-4, the client computer networked with a server network computer with a server application, the computer readable medium comprising:

a protocol-independent reentrant networking function, having an address input for receiving a destination address, for establishing an application connection that utilizes an application protocol from said group of application protocols between a selected client application on the client computer and the server application on the server network computer, the destination address identifying one of said group of application protocols for exchanging data with the server application;

a protocol-independent reentrant networking function for exchanging information, according to the identified application protocol, between the selected client application on the client computer and the server application on the server network computer;

wherein at least one of the reentrant networking functions imposes file system semantics on application protocols not otherwise organized according to file system semantics, at least one such reentrant function utilizes an application protocol from said group of application protocols, and at least one reentrant function using a network connection based upon a network communication protocol from said group of network communication protocols.

2. The computer readable medium of claim 1 further comprising a reentrant networking function for establishing a network connection to the Internet.

3. The computer readable medium of claim 1, the client computer executing thereon an operating system having at least one file system semantic, and an inspection interface for reviewing data formatted according to the at least one file system semantic, where all the reentrant networking functions are organized according to the at least one file system semantic, so that data from such networking functions can be displayed with the inspection interface.

4. The computer readable medium of claim 1 further comprising a reentrant networking function for establishing a network connection to an intranet.

5. The computer readable medium of claim 1, wherein the plurality of network communication protocols includes an Internet protocol, and wherein the protocol-independent reentrant networking function for establishing the application connection includes a port address parameter for specifying the Internet protocol for a network connection between the selected client application and the server application.

6. The computer readable medium of claim 1, wherein the plurality of network communication protocols includes an intranet protocol, and wherein the protocol-independent reentrant networking function for establishing the application connection includes a port address parameter for specifying the intranet protocol for a network connection between the selected client application and server application.

7. The computer readable medium of claim 1 where the selected client application is an Internet browser.

8. The computer readable medium of claim 1 further comprising:

a protocol-dependent reentrant networking function for exchanging information according to the identified application protocol between the selected client application and the server application.

9. A method for providing network communication using the computer readable medium of claim 1, wherein the client computer has an operating system with a plurality of operating system threads, the method comprising:

furnishing an operating system thread for each call made to a reentrant network interface function by a client application; and synchronizing the calls made to the reentrant network interface functions with each of the operating system threads furnished.

10. A method for providing network communication using the computer readable medium of claim 1, wherein the client computer has an operating system with a plurality of operating system threads, the method comprising:

selectively providing an asynchronous operating mode for one or more functions in the library of reentrant network interface functions;

selectively providing a call back function for each reentrant network interface function operating in the asynchronous mode;

providing a single operating system thread to service calls made to reentrant network interface functions operating in the asynchronous operating mode;

synchronizing the calls made to reentrant network interface functions operating in the asynchronous operating mode with the single operating system thread;

executing asynchronously a call to a reentrant network interface function selected to operate in the asynchronous mode; and calling the call back function for each reentrant network interface function operating in the asynchronous mode when reentrant network interface function has completed execution.

11. A method for providing access to a server network computer using the library of reentrant network interface functions of claim 1, the method comprising:

allowing a client application to call a selected reentrant network interface function; and executing the called reentrant network interface function.

12. The computer readable medium of claim 1 further comprising:

a reentrant networking function for authenticating a response from a server network computer; and a reentrant networking function for providing secure data exchange between a client application and a server application, where the secure data exchange includes data encryption.

13. The computer readable medium of claim 12 wherein the data encryption includes RSA data encrpytion.

14. The computer readable medium of claim 12 wherein the secure data exchange includes secure socket layer data exchange.

15. The computer readable medium of claim 12 wherein the secure data exchange includes private communications technology data exchange.

16. A programming tool kit providing a library of reentrant network interface functions providing a common calling interface for networking application protocols including at least one application protocol selected from the group consisting of HTTP, FTP, SMTP, and Gopher, such functions generally available to, and callable simultaneously by, a plurality of client applications on a client computer, and such functions using one or more network connections based upon a network communication protocol from the group of network communication protocols consisting of TCP/IP, UDP/IP, NetBIOS, NetBUEI, IPX/SPX, DECnet, and OSI/TP-4, the client computer having access to a computer network including a server network computer with a server application, the computer readable medium comprising:

a reentrant networking function for providing a plurality of individual selectable application protocols to connect a selected client application to a server application;

a protocol-independent reentrant networking function for establishing an application protocol session between the selected client application and the server application with a selected one of the application protocols;

a protocol-independent reentrant networking function for providing a common interface for sending requests, according to the selected application protocol, between the selected client application and the server application; and a protocol-independent reentrant networking function for receiving at the selected client application protocol-dependent responses to the requests sent to the server application according to a selected application protocol;

wherein the networking functions for sending requests and receiving responses thereto are organized with file system semantics, such semantics being imposed on at least one selectable application protocols not so organized, at least one such reentrant function utilizes an application protocol from said group of application protocols, and at least one reentrant function utilizes a network connection based upon a network communication protocol from said group of network communication protocols.

17. The programming tool kit of claim 16, wherein the reentrant networking function for providing a plurality of individual selectable application protocols also provides a plurality of individually selectable network communication protocols to connect the client computer to the server network computer.

18. The programming tool kit of claim 16 where the plurality of application protocols includes any of HTTP, FTP, SMTP, and Gopher.

19. The programming tool kit of claim 16, where the common interface for the reentrant networking function for sending requests provides for querying the server application, according to the selected application protocol, for information, reading data from the server application, and writing data to the server application.

20. The programming tool kit of claim 16, where a single reentrant networking function provides:

selectively setting one each of a plurality of network connection access options, such options including a direct connection to the computer network, a connection to the computer network through a predetermined application on the client computer, and a connection to the network through a network proxy application;

selectively setting one or more of the reentrant network functions to operate in a synchronous or asynchronous mode;

selectively setting, for one of the plurality of communication protocols, internal caching within the client computer for information returned to the client computer from the network server computer; and initializing internal data structures used for connecting with the computer network.

21. A method for a single networking function to establish the application protocol session of claim 16, comprising:

establishing a connection to a server application;

selectively setting any of a plurality of application protocol session connection options including establishing HTTP, FTP, SMTP and Gopher application protocol sessions; and selectively setting call back information for the selected client application operating in an asynchronous mode.

22. The programming tool kit of claim 16 wherein the protocol-independent reentrant networking function for establishing an application protocol session includes a port address parameter for specifying a network communication protocol for a network connection between the selected client application and the server application.

23. The programming tool kit of claim 16 further comprising:

a protocol-dependent reentrant networking function for exchanging information according to the selected application protocol between the selected client application and the server application.

24. The programming tool kit of claim 20 wherein the single reentrant networking function for selectively setting and initializing is the reentrant networking function for providing a plurality of individual selectable application protocols.

25. A computer readable medium having stored therein a library of network interface functions generally available to, and callable simultaneously by, a plurality of client applications on a client computer, the client computer having access to a computer network including a server network computer with a server application, the computer readable medium comprising:

a protocol-independent networking function having a destination-address input, for establishing an application connection utilizing an application protocol selected from a group of application protocals between a selected client application on the client computer and the server application on the server network computer, the destination address identifying one of a plurality of application protocols selected from a group of application protocols for exchanging data with the server application; and a protocol-independent networking function for exchanging information, according to the identified application protocol, between the selected client application on the client computer and the server application on the server network computer;

wherein each protocol-independent function provides a common calling interface that abstracts calling requirements for each of the plurality of application protocols into a common generic calling interface, and at least one reentrant function utilizes an application protocol selected from the group consisting of HTTP, FTP, SMTP, and Gopher, such functions using one or more network connections based upon a network communication protocol selected from the group of network communication protocols consisting of TCP/IP, UDP/IP, NetBIOS, NetBUEI, IPX/SPX, DECnet, and OSI/TP-4.

26. A computer readable medium having stored therein a library of reentrant network interface functions generally available to, and callable simultaneously by, a plurality of client applications on a client computer, the client computer having access to a computer network including a server network computer with a server application, the computer readable medium comprising:

a reentrant networking function for providing a plurality of individually selectable application protocols from a group consisting of HTTP, FTP, SMPT, and Gopher to connect a selected client application to a server application;

a protocol-independent reentrant networking function for establishing an application protocol session between the selected client application and the server application with a selected one of the application protocols;

a protocol-independent reentrant networking function for providing a common interface for sending requests, according to the selected application protocol, from the selected client application to the server application; and a protocol-independent reentrant networking function for receiving at the selected client application protocol-dependent responses to the requests sent to the server application according to the selected application protocol;

wherein at least one of the reentrant networking functions is organized is organized with file system semantics, and at least one reentrant function utilizes an application protocol selected from the group consisting of HTTP, FTP, SMTP, and Gopher such functions using one or more network connections based upon a network communication protocol selected from the group of network communication protocols consisting of TCP/IP, UDP/IP, NetBIOS, NetBUEI, IPX/SPX, DECnet, and OSI/TP-4.

27. The method of claim 21, where establishing a connection to a server application includes:

selectively setting the name of the server application by specifying an alphanumeric name of the server application and an IP address of the server application;

selectively setting a server application port for connecting to;

selectively setting a name on the server network computer to login as; and selectively setting a password for the selected name on the server network computer to login with.

28. The computer readable medium of claim 26 wherein the library of reentrant network interface functions is hierarchically organized into one or more sets comprising:

a set of protocol-independent reentrant network interface functions;

a first set of protocol-dependent reentrant network interface functions, each of said first set of protocol-dependent reentrant network interface functions callable only after a call to a protocol-independent reentrant network interface function in the set of protocol-independent reentrant network interface functions; and a second set of protocol-dependent reentrant network interface functions, each of said second set of protocol-dependent reentrant network interface functions callable only after a call to a protocol-dependent reentrant network interface function in the first set of protocol-dependent reentrant network interface functions.

29. A method of providing network communication between the client computer and the server network computer in accordance with the reentrant network interface functions of claim 28, the method comprising:

returning a protocol-independent function handle from each call to a protocol-independent reentrant network interface function;

requiring the returned protocol-independent function handle be used when making a call to a protocol-dependent reentrant network interface function from the first set of protocol-dependent reentrant network interface functions;

returning a first protocol-dependent function handle from each call to a protocol-dependent reentrant network interface function from the first set of protocol-dependent reentrant network interface functions; and requiring the returned first protocol-dependent function handle to be used when making a call to a protocol-dependent reentrant network interface function from the second set of protocol-dependent reentrant network interface functions.

30. The method of claim 29 where the first protocol-dependent function handle inherits access to all internal data associated with the protocol-independent function handle.

31. The method of claim 29 where a second protocol-dependent function handle inherits access to all internal data associated with the protocol-independent function handle and first protocol-dependent function handle.

32. The method of claim 29 where the function handles are not useable in function calls which are not reentrant network interface function calls.

\* \* \* \* \*

UNITED STATES PATENT AND TRADEMARK OFFICE
CERTIFICATE OF CORRECTION

PATENT NO. : 5,987,517
DATED : November 16, 1999
INVENTOR(S) : Firth et al.

It is certified that error appears in the above-identified patent and that said Letters Patent is hereby corrected as shown below:

| Col./Line | Error Reads | Should Read |
|---|---|---|
| 1/67 | must a manage | must manage |
| 3/17 | "libwww.ext" | "libwww" files |
| 3/21 | functions are also | functions also |
| 3/27 | level-N | level N |
| 3/28 | level-N-1 | level N-1 |
| 3/41 | initialized | initialize |
| 3/56 | "firewall, | "firewall," |
| 5/18 | sentence missing | (Note that all marks referenced in this description are the property of their respective owners). |
| 5/61 | as; well | as well |
| 6/2 | client,' server | client/server |
| 7/3 | program | programs |
| 7/19 | such the | such as the |
| 7/25 | 46 | 48 |
| 7/26 | with | through calls to |
| 7/26 | function calls | functions |
| 8/50 | provide a | provide an application program a |
| 8/51 | interface to | interface, to |
| 8/52 | intranet) for an application program | intranet), |
| 8/66 | libraries | libraries, |
| 8/67 | semantics | semantics, |
| 9/11 | names, the | names, if such libraries are used, the |
| 9/15-16 | created if such libraries are used. | created. |
| 9/19 | functions calls based | functions based |
| 10/54 | **unload | ..unload |
| 11/49 | cann ot | cannot |

UNITED STATES PATENT AND TRADEMARK OFFICE
CERTIFICATE OF CORRECTION

PATENT NO. : 5,987,517
DATED : November 16, 1999
INVENTOR(S) : Firth et al.

It is certified that error appears in the above-identified patent and that said Letters Patent is hereby corrected as shown below:

| | | |
|---|---|---|
| 11/55 | return ed | returned |
| 11/55 | arg um ent | argument |
| 12/1 | and are known | are known |
| 12/19 | then calls | may then call |
| 13/24 | pre-thread | per-thread |
| 15/1 | a list of 122 and requests | 122, and a list of requests |
| 16/16 | some the | some of the |
| 16/49 | may found | may be found |
| 17/37 | lpzaPassword | lpszPassword |
| 18/30 | .nternet | internet |
| 19/25 | such the | such as the |
| 19/42 | change the | change to the |
| 19/66 | and well as | as well as |
| 104/40 | protocols between | protocols, between |
| 104/45 | protocols for | protocols, for |
| 105/24 | is organized is organized | is organized |

Signed and Sealed this

Seventeenth Day of April, 2001

Attest:

NICHOLAS P. GODICI

Attesting Officer     *Acting Director of the United States Patent and Trademark Office*